(12) United States Patent
Koizumi

(10) Patent No.: US 9,088,772 B2
(45) Date of Patent: Jul. 21, 2015

(54) IMAGE-CAPTURING APPARATUS

(75) Inventor: Tatsuro Koizumi, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 13/439,138

(22) Filed: Apr. 4, 2012

(65) Prior Publication Data

US 2012/0262594 A1 Oct. 18, 2012

(30) Foreign Application Priority Data

Apr. 13, 2011 (JP) .................... 2011-089445

(51) Int. Cl.
| | |
|---|---|
| H04N 5/225 | (2006.01) |
| H04N 5/232 | (2006.01) |
| H04N 13/00 | (2006.01) |
| G06T 7/00 | (2006.01) |
| H04N 13/02 | (2006.01) |

(52) U.S. Cl.
CPC .......... *H04N 13/0014* (2013.01); *G06T 7/0051* (2013.01); *H04N 5/2254* (2013.01); *H04N 5/2258* (2013.01); *H04N 5/23232* (2013.01); *H04N 13/0048* (2013.01); *H04N 13/0242* (2013.01); *H04N 13/0296* (2013.01); *H04N 2013/0085* (2013.01)

(58) Field of Classification Search
USPC ......... 348/218.1, 157; 382/154, 103; 345/419
See application file for complete search history.

(56) References Cited

U.S. PATENT DOCUMENTS

| | | | |
|---|---|---|---|
| 6,205,178 B1 * | 3/2001 | Suzuki et al. ............ 375/240.15 |
| 2006/0061567 A1 * | 3/2006 | Ouchi ......................... 345/419 |
| 2008/0192116 A1 * | 8/2008 | Tamir et al. .................. 348/157 |
| 2009/0167909 A1 * | 7/2009 | Imagawa et al. ............. 348/262 |
| 2010/0201810 A1 * | 8/2010 | Shimazaki et al. .......... 348/135 |

OTHER PUBLICATIONS

S. Gorier et al., "The Lumigraph", SIGGRAPHY, 96, pp. 43-52 (1996).
A. Isaksen et al., "Dynamically Reparameterized Light Fields", ACM SIGGRAPH, pp. 297-306 (2000).
Wilburn et al., "High-Speed Videography Using a Dense Camera Array", CVPR '04, pp. 1-8.
C. Harris et al., "A Combined Corner and Edge Detector", Proceedings of the 4th Alvey Vision Conference, pp. 147-151 (1988).
D. Lowe, "Distinctive Image Features from Scale-Invariant Keypoints", International Journal of Computer Vision 60 (2), pp. 1-28 (2004).

* cited by examiner

*Primary Examiner* — Roberto Velez
*Assistant Examiner* — Stephen Coleman
(74) *Attorney, Agent, or Firm* — Fitzpatrick, Cella, Harper & Scinto

(57) ABSTRACT

In a motion picture capturing system for generating a virtual viewpoint image by a plurality of cameras, if image-capturing is performed with timing being shifted to improve frame rate performance, estimation accuracy is deteriorated due to an error in corresponding point detection between images or the presence of a moving subject. The image-capturing timing is controlled such that two or more of a plurality of image-capturing units perform simultaneous image-capturing, and motion of the whole of an image-capturing apparatus is estimated from a plurality of images captured by the simultaneous image-capturing. The virtual viewpoint image is synthesized from the images captured by the simultaneous image-capturing by the plurality of image-capturing units and the estimated motion.

12 Claims, 17 Drawing Sheets

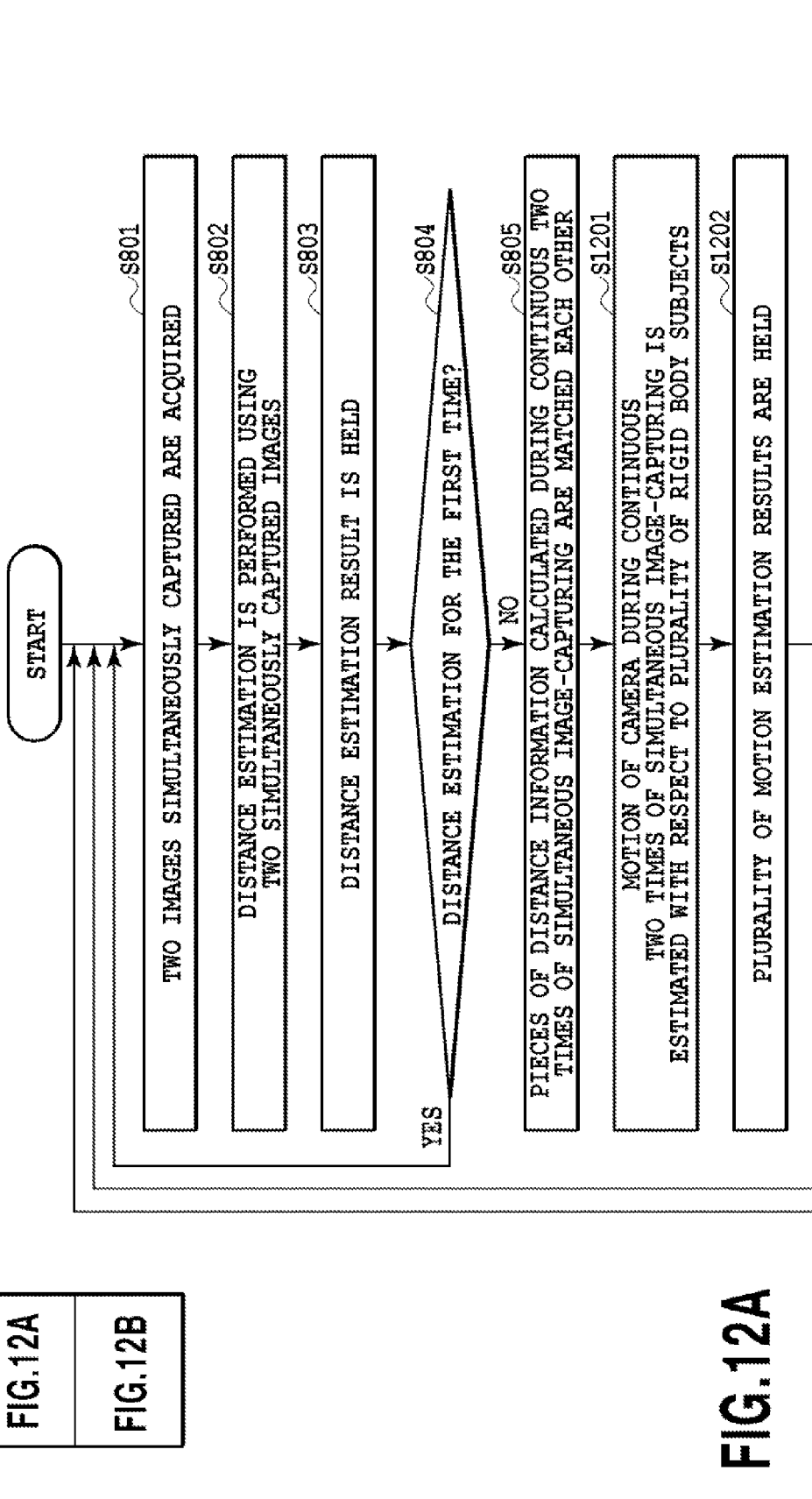

IMAGE-CAPTURING APPARATUS

BACKGROUND OF THE INVENTION

1. Field of the Invention

The present invention relates to an image-capturing apparatus that synthesizes a virtual viewpoint image using images captured by a plurality of image-capturing units.

2. Description of the Related Art

In the past, a digital camera has had limited ranges of obtainable resolution, bokeh (blur), angle of view, viewpoint and the like of an image, depending on characteristics and arrangement of an optical system or image-capturing element of the camera used for capturing image. It is more convenient for a user if an image conforming to various conditions can be acquired by one apparatus, and an image-capturing apparatus that has such characteristics is always demanded.

There is a technique to cope with the demand like this, in which images captured by a plurality of cameras having different viewpoints are used to synthesize an image which is as if captured by one virtual camera, and thereby the image overcoming the above limits in each of the cameras can be acquired. The synthesized image like this as if captured by the virtual camera is called a virtual viewpoint image. In Steven J. Gortler et al., "The lumigraph", SIGGRAPH 96, pp 43-52, (1996) (hereinafter referred to as "Steven"), a method is disclosed in which images captured by a plurality of cameras are used to synthesize an image which is as if captured by a camera having a virtual viewpoint. Further, in A. Isaksen et. al., "Dynamically Reparameterized Light Fields", ACM SIGGRAPH, pp. 297-306 (2000) (hereinafter referred to as "Isaksen"), a method is disclosed in which images captured by a plurality of cameras having a focus closing to pan focuses is used to synthesize an image which is as if captured by a camera having a certain size of aperture.

On the other hand, in a motion picture capturing apparatus such as a video camera, a frame rate of an obtainable video is also an important factor that characterizes the image-capturing apparatus. In Wilburn et. al., "High-Speed Videography Using a Dense Camera Array", CVPR'04 (hereinafter referred to as "Wilburn"), a technique is disclosed in which image-capturing is performed by a plurality of cameras with timing being shifted, and on the assumption that a subject is on a plane at a fixed distance from the cameras, geometric transform is performed to synthesize a video having a frame rate which exceeds performance of each of the cameras.

There can be considered that in the motion picture capturing system that generates the virtual viewpoint image using the plurality of cameras based on the techniques such as Steven and Isaksen, the image-capturing is performed with the timing being shifted as the technique of Wilburn, leading to improvement of the frame rate performance. The techniques such as Steven and Isaksen are based on the assumption that a position and orientation of the camera are given. For this reason, in the case where image-capturing is performed with timing being shifted as in the technique of Wilburn by use of handheld cameras or the like with positions and orientations of the cameras varied, a relationship in position and orientation between the cameras needs to be estimated. The relationship in position and orientation between the cameras can be estimated by calculating a fundamental matrix in the projective geometry; however, there is a problem of an error in corresponding point detection between images or deterioration in estimation accuracy due to the presence of a moving subject.

SUMMARY OF THE INVENTION

An image-capturing apparatus according to the present invention includes: a plurality of image-capturing units; a image-capturing timing control unit configured to control image-capturing timing such that two or more of the plurality of image-capturing units perform simultaneous image-capturing; a motion estimation unit configured to estimate motion of a whole of the image-capturing apparatus from pieces of image data simultaneously captured by the plurality of image-capturing units; and a virtual viewpoint image synthesis unit configured to synthesize virtual viewpoint image data from the pieces of image data simultaneously captured by the plurality of image-capturing units and the motion estimated by the motion estimation unit.

The present invention produces, in a motion picture capturing system for synthesizing a virtual viewpoint video using images captured by a plurality of image-capturing units, an effect of improving frame rate performance while maintaining estimation accuracy of a position and orientation of each of the image-capturing units.

Further features of the present invention will become apparent from the following description of exemplary embodiments with reference to the attached drawings.

BRIEF DESCRIPTION OF THE DRAWINGS

FIG. 12 is a diagram showing the relationship of FIGS. 12A and 12B;

FIGS. 12A and 12B are flowcharts showing an example of image synthesis processing according to the second embodiment of the present invention;

DESCRIPTION OF THE EMBODIMENTS

First Embodiment (Overall Configuration of Image-Capturing Apparatus)

Figure 1A:
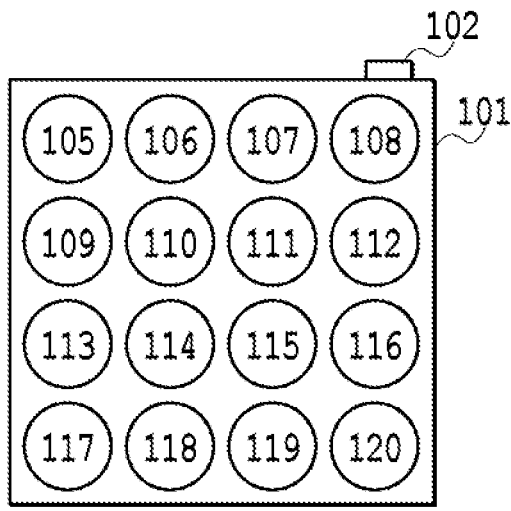
FIGS. 1A and 1B are schematic views showing an example of an image-capturing apparatus including a plurality of cameras according to a first embodiment of the present invention.
Figure 1B:
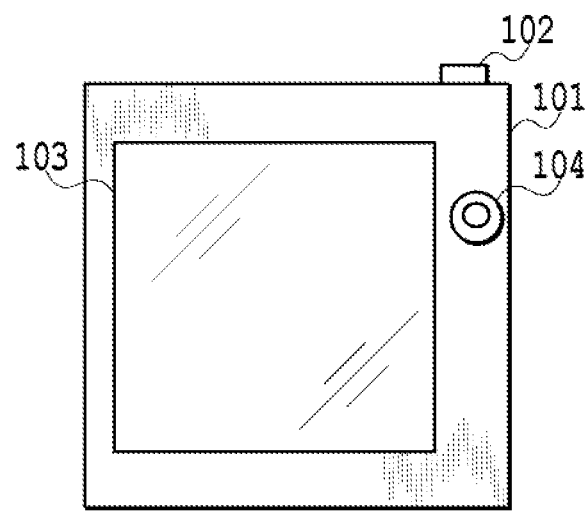

FIGS. 1A and 1B are an example of a schematic view of an image-capturing apparatus including a plurality of cameras according to a first embodiment of the present invention. The image-capturing apparatus includes a camera body 101. FIG. 1A is a front view of the image-capturing apparatus and FIG. 1B is a rear view of the image-capturing apparatus. Cameras 105 to 120 are arranged on the front face of the image-capturing apparatus in a matrix pattern. The image-capturing apparatus further includes an image-capturing button 102, display 103 and manual operation button 104. The manual operation button 104 and display 103 are used for setting, and the image-capturing button 102 is pressed down to perform image-capturing by the camera 105 to 120. The acquired images are used to synthesize an image, a result of which is displayed on the display 103. Hereinafter, such an image-capturing apparatus including the plurality of cameras is referred to as a camera array (as known as camera array system, multiple lens camera, and the like).

Figure 2:
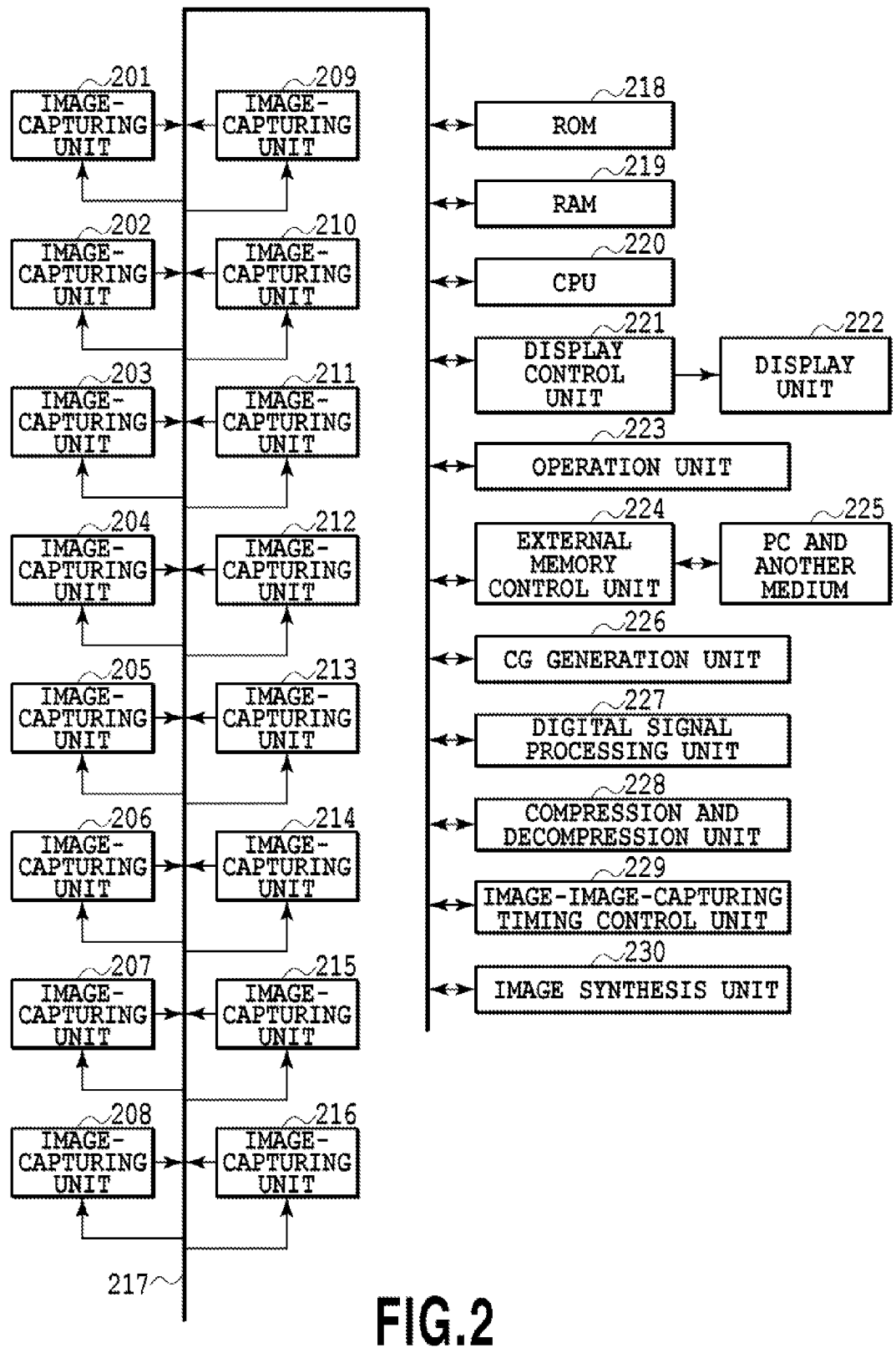
FIG. 2 is a block diagram showing an example of a configuration of the image-capturing apparatus according to the first embodiment of the present invention.

FIG. 2 shows respective processing units of the camera array in FIG. 1. The respective processing units exchange information and signals with each other through a bus 217.

A CPU 220 relates to all processes in the respective components, and sequentially reads and interprets commands stored in a ROM 218 or RAM 219 to perform a process according to a corresponding result. Further, the ROM 218 and RAM 219 provide the CPU 220 with a program, data, work space and the like necessary for the process.

An operation unit 223 corresponds to a button, a dial and the like, that is, specifically to the manual operation button 104 and image-capturing button 102 of FIG. 1. The image-capturing apparatus receives a user's instructions via them. The operation unit 223, ROM 218, RAM 219, CPU 220, display control unit 221, display unit 222, and CG generation unit 226 (221, 222 and 226, described later) are cooperated with one another to realize a user interface. Via the user interface, parameter settings such as focus length, diaphragm, exposure time and the like for image-capturing, display settings of a captured image, image-capturing start instruction by a user, and the like are performed.

Figure 3:
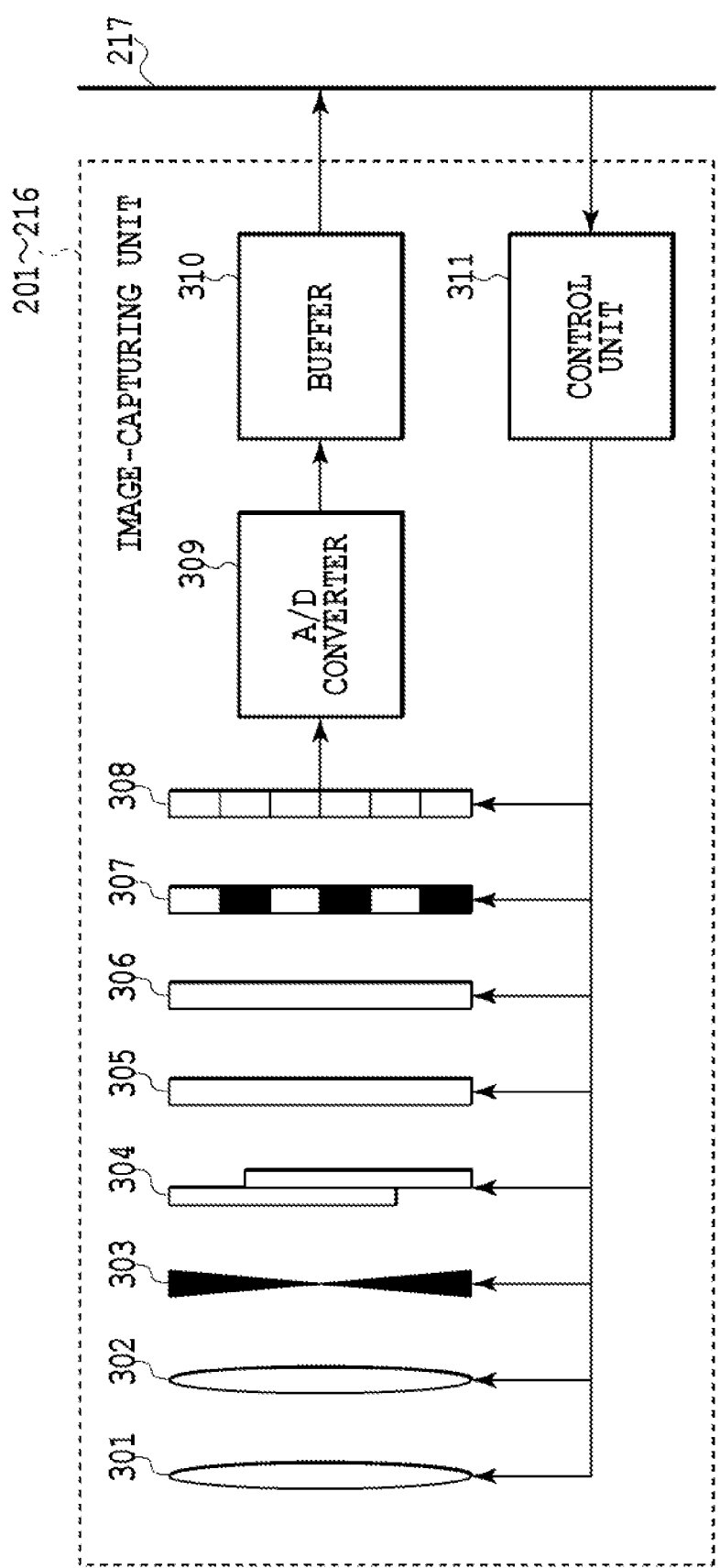
FIG. 3 is a block diagram showing an example of a configuration of an image-capturing unit according to the first embodiment of the present invention.

The image-capturing units 201 to 216 correspond to the cameras 105 to 120 in FIG. 1 and perform image-capturing based on a image-capturing instruction issued from a image-capturing timing control unit 229. FIG. 3 is used to explain the image-capturing units 201 to 216 in detail. A camera unit of each of the image-capturing units 201 to 216 includes a zoom lens 301, focus lens 302, diaphragm 303, shutter 304, optical lowpass filter 305, IR cut filter 306, color filter 307, image-capturing element 308 such as a CMOS or CCD, and the like. The image-capturing element 308 converts a light amount of an image of a subject into an electrical signal. An A/D converter 309 converts the electrical signal into digital data. A buffer 310 temporarily stores the digital data. A control unit 311 controls the zoom lens 301, focus lens 302 and diaphragm 303 according to the focus length and diaphragm value set by the user. The control unit 311 also controls the shutter 304 and image-capturing element 308 according to the image-capturing instruction to perform image-capturing. Pieces of acquired image data are held in the image-capturing units 201 to 216 once and then sequentially read out.

Generally a liquid crystal display is widely used for the display unit 222, which corresponds to the display 103 in FIG. 1. The display unit 222 is controlled by the display control unit 221 to display characters and images received from the CG generation unit 226 or an image synthesis unit 230 described later.

An external memory control unit 224 is an interface for connecting to a PC and another medium 225 (e.g., a hard disk, memory card, CF card, SD card or USB memory). The external memory control unit 224 outputs data or the like stored in the RAM 219 outside the image-capturing apparatus in response to reception of an output instruction from the CPU 220.

The CG generation unit 226 generates characters, graphics and the like for realizing the user interface.

Figure 4:
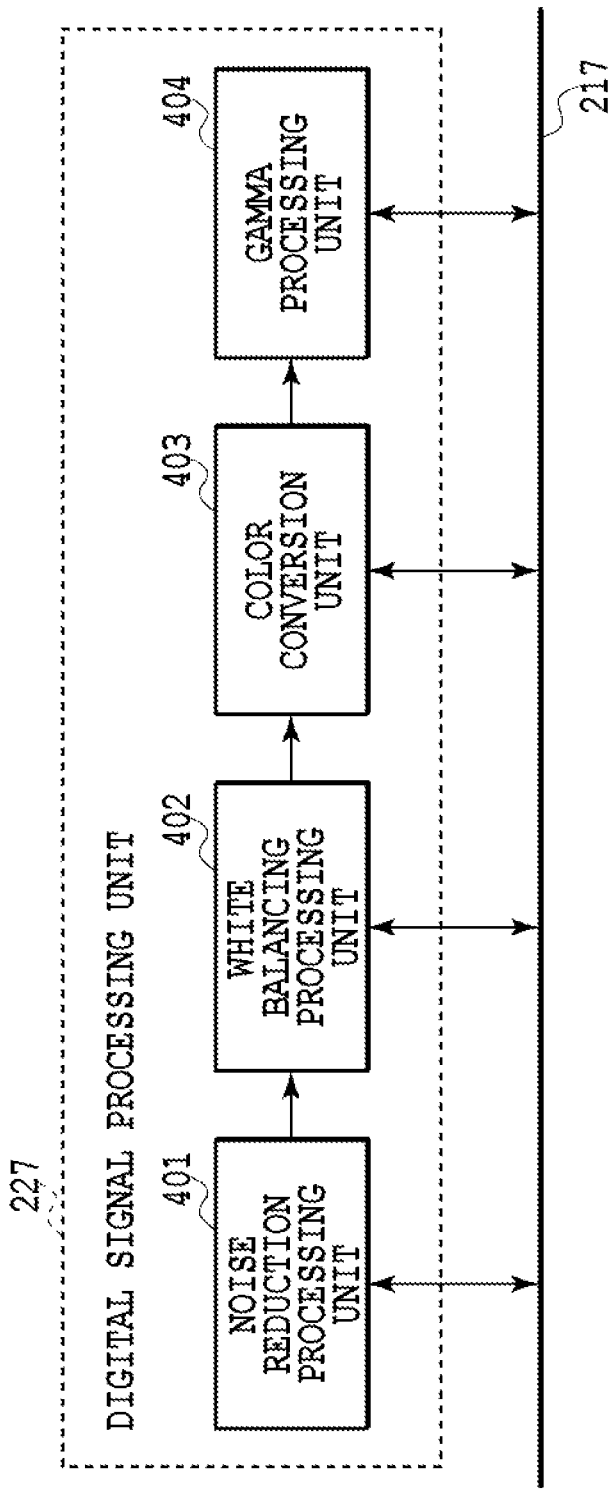
FIG. 4 is a block diagram showing an example of a configuration of a digital signal processing unit according to the first embodiment of the present invention.

A digital signal processing unit 227 performs a noise reduction process, white balancing process, color conversion process and gamma process on digital image data. A configuration of the digital signal processing unit 227 is shown in FIG. 4. The digital signal processing unit 227 includes a noise reduction processing unit 401, white balancing processing unit 402, color conversion unit 403 and gamma processing unit 404. The digital signal processing unit 227 converts pixel values to luminance values and reduces noise depending on an image-capturing element on pieces of digital image data immediately after captured by the image-capturing units 201 to 216, and thereby converts the pieces of data so as to be physically true. Further, the digital signal processing unit 227 adjusts the image after the image synthesis so as to have desired image quality.

A compression and decompression unit 228 performs processing of converting an image generated by the image synthesis unit 230 into a file format such as Jpeg or Mpeg.

The image-capturing timing control unit 229 determines timing for each of the image-capturing units 201 to 216 to capture an image, and issues a image-capturing instruction. During the image-capturing, simultaneous image-capturing is repeatedly performed by, for example, any two of the image-capturing units 201 to 216. A image-capturing interval in the simultaneous image-capturing is determined according to a frame rate set for the image-capturing units. A method for calculating image-capturing timing is described in detail later.

The image synthesis unit 230 synthesizes the images captured by the image-capturing units 201 to 216 into a virtual viewpoint image. The synthesized image is displayed on the display unit 222, and compressed by the compression and decompression unit 228 to be sequentially recorded in the PC or another medium 225. A method for synthesizing an image is described in detail later.

There may be components of the apparatus other than those described above, but description of them is omitted because it is not a main theme of the present embodiment.

Note that the 16 image-capturing units are described in the present embodiment, but the present embodiment does not limit the number of image-capturing units, which may be any number as long as it is three or more. That is, any number of image-capturing units may be used as long as the apparatus has a configuration in which two or more sets of image-capturing units can be prepared for the simultaneous image-capturing so as to be able to capture an image from multiple viewpoints.

(Processing Flow Upon Image-Capturing)

Figure 5:
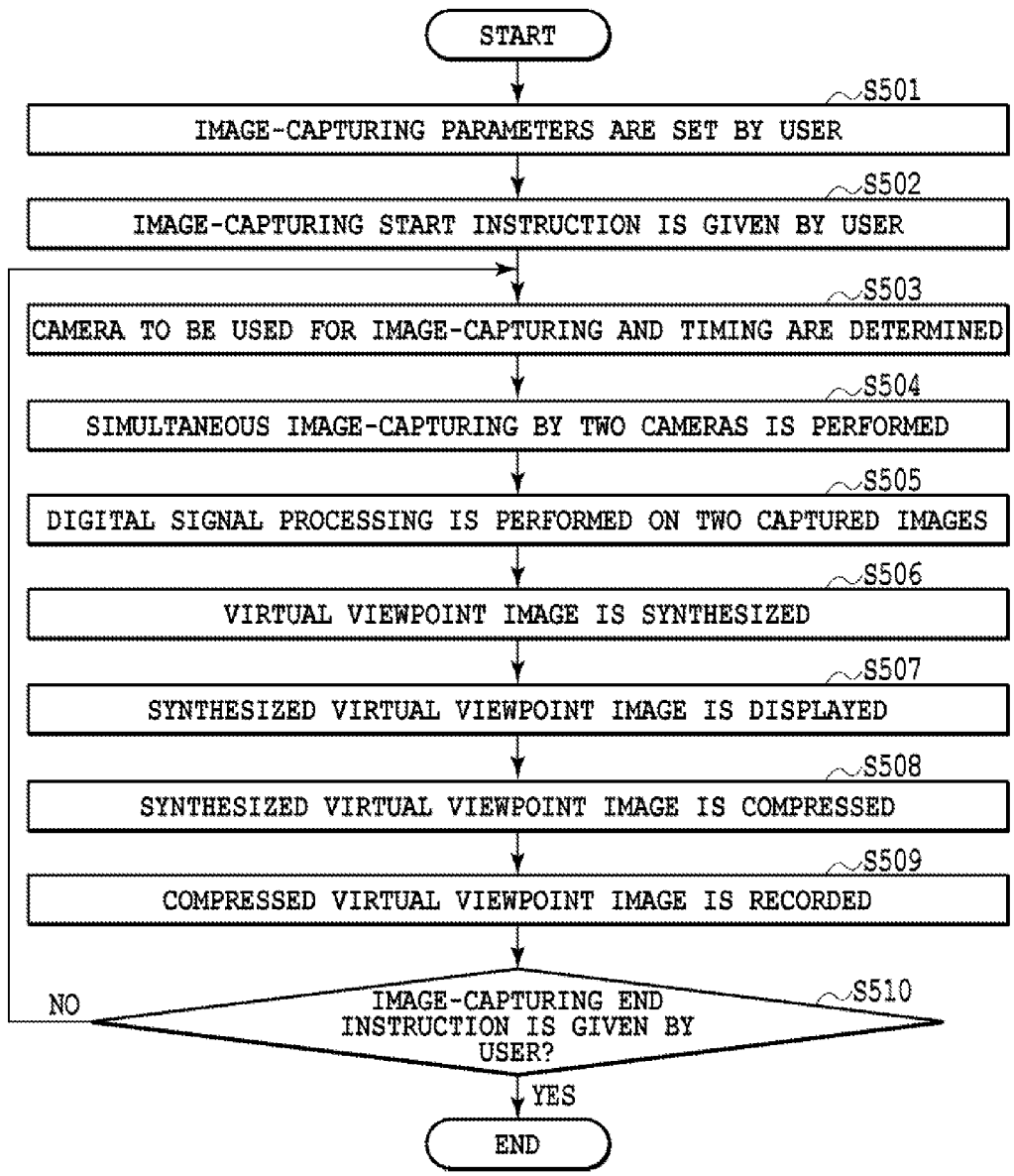
FIG. 5 is a flowchart showing an example of an image-capturing procedure by the image-capturing apparatus according to the first embodiment of the present invention.

FIG. 5 is a flowchart showing processing at the time of image-capturing by the camera array. Respective processes described below are performed by the CPU 220 in such a manner that, for example, the CPU 220 reads and interprets commands stored in the ROM 218 or RAM 219. In FIG. 5, first, image-capturing parameters such as the focus length, diaphragm and exposure time are set by a user in step S501. The image-capturing parameters are input via the user interface realized by cooperation among the ROM 218, RAM 219, CPU 220, display control unit 221, display unit 222, operation unit 223 and CG generation unit 226. The inputted parameters are transmitted via the bus 217 to the image-capturing units 201 to 216 for setting.

In step S502, the image-capturing start instruction by the user is received. The image-capturing start instruction is received via the operation unit 223 from the user, and transmitted via the bus 217 to the image-capturing timing control unit 229.

Steps S503 to S510 correspond to a loop that is repeated during image-capturing. In step S503, cameras used for image-capturing and image-capturing timing are determined. In the present embodiment, the simultaneous image-capturing by two cameras is performed for every image-capturing. The image-capturing interval in the simultaneous image-capturing is determined based on the frame rate of the cameras. The cameras used for image-capturing are selected such that image-capturing by all the cameras is performed in (the number of cameras/2) times of image-capturing. The image-capturing timing of each of the image-capturing units 201 to 216 is determined by the image-capturing timing control unit 229, and the image-capturing instruction is transmitted via the bus 217 to each of the image-capturing units 201 to 216. The method for calculating image-capturing timing is described in detail later.

In step S504, the simultaneous image-capturing by two cameras is performed. Here, image-capturing units having received the image-capturing instruction in step S503 perform the image-capturing.

In step S505, two pieces of image data captured in step S504 are subjected to a digital signal process. The digital signal processing unit 227 reads out sequentially the pieces of image data from the image-capturing units having performed the image-capturing, performs the digital signal process, and passes the resultant to the image synthesis unit 230.

In step S506, the virtual viewpoint image is synthesized from the pieces of latest image data captured by the respective cameras. The image synthesis is performed in such a manner that the image synthesis unit 230 receives the pieces of image data from the digital signal processing unit 227, performs the image synthesis, and thereafter stores the synthesized image data in the RAM 219. The method for synthesizing an image is described in detail later.

In step S507, the image synthesized in step S506 is displayed. The image display is performed in such a manner that the display control unit 221 reads out synthetic image data from the RAM 219 and displays the corresponding image on the display unit 222.

In step S508, the image data representing the image synthesized in step S506 is compressed. The image data compression is performed in such a manner that the compression and decompression unit reads out the synthetic image data from the RAM 219 and compresses it.

The compressed image data is recorded in step S509. The image data recording is performed in such a manner that the external memory control unit 224 receives the compressed image data and records it in the PC or another medium 225.

Step S510 is a step of determining whether or not the processing ends, and if a image-capturing end instruction is given by the user during the processes in steps S503 to S509, image-capturing is finished. If the image-capturing end instruction is not given, the flow returns to step S503 to repeat the processing. The image-capturing end instruction by the user is received via the operation unit 223 from the user.

(Method for Calculating Image-Capturing Timing)

Figure 6:
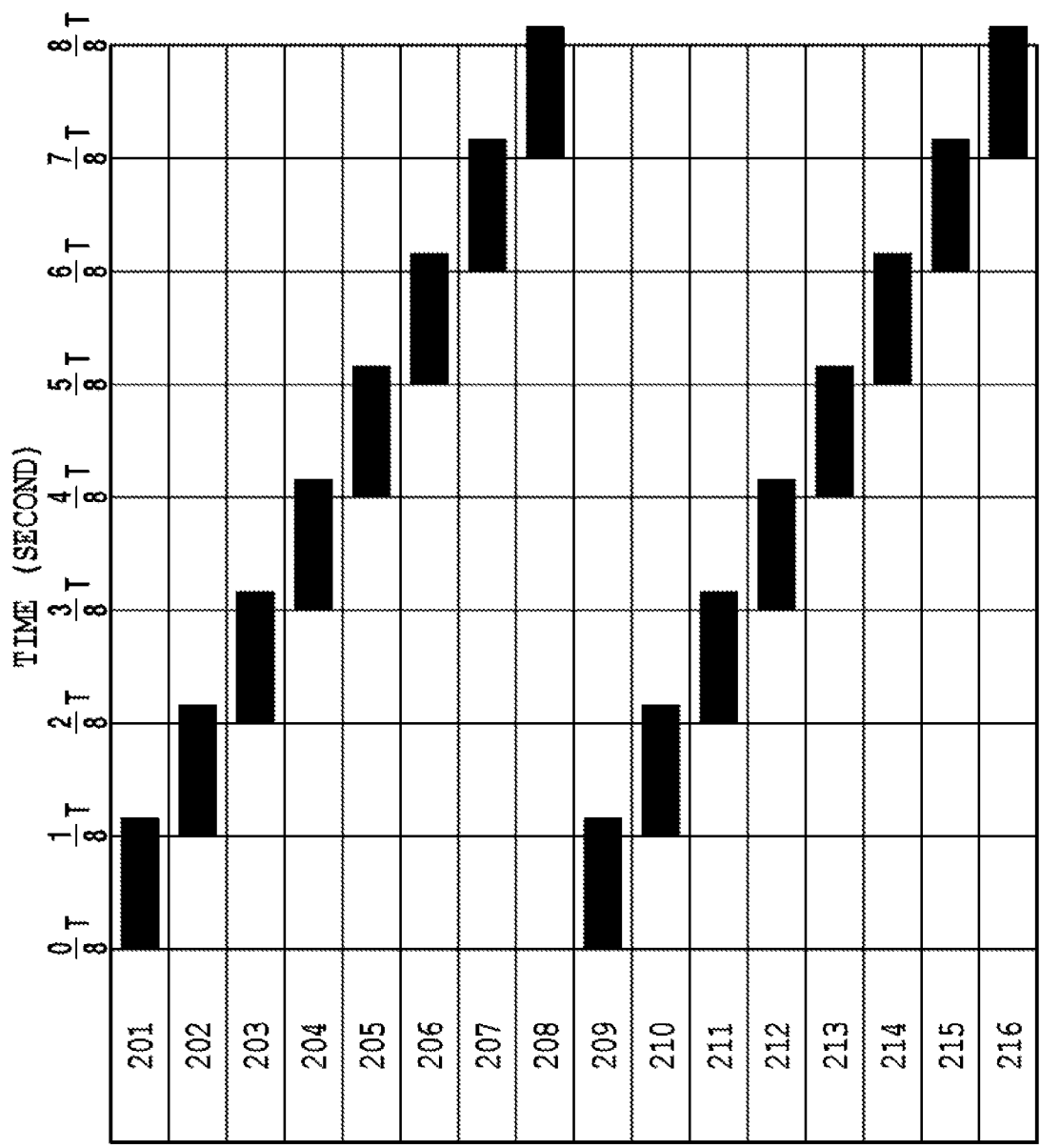
FIG. 6 is a schematic view illustrating image-capturing timing generated by a image-capturing timing control unit according to the first embodiment of the present invention.

The method for calculating image-capturing timing in the image-capturing timing control unit is described. In the case where the frame rate of each of the cameras is set to f (frames/second), a time period of $T=1/f$ (second) is required for the camera to read out one image. In the present embodiment, the simultaneous image-capturing is always performed by two cameras of the camera array, and in a state where a combination of two cameras is changed in T (seconds) such that all the cameras are used, the simultaneous image-capturing by two cameras is performed with timing being shifted. If the camera array is constituted by N cameras, the image-capturing interval in the simultaneous image-capturing is $2 \cdot T/N$. An example of the image-capturing timing corresponding to the first embodiment is shown in FIG. 6. The first column on the left side is the number representing the image-capturing unit. Characters on the upper portion in the drawing represent time. The time proceeds from left to right. A time period during exposure is expressed by a black rectangle. In the first embodiment, there are the 16 image-capturing units, and thus the image-capturing interval in the simultaneous image-capturing is T/8. The exposure time may take any value as long as it is equal to T or less, and is set to achieve adequate exposure.

Note that the present embodiment does not limit the combination in the simultaneous image-capturing, and any combination may be used. Further, the combination in the simultaneous image-capturing is not fixed but may be changed during image-capturing. Also, the present invention may be configured such that the simultaneous image-capturing is performed by three or more cameras rather than the simultaneous image-capturing by two cameras.

(Configuration of Image Synthesis Unit)

Figure 7:
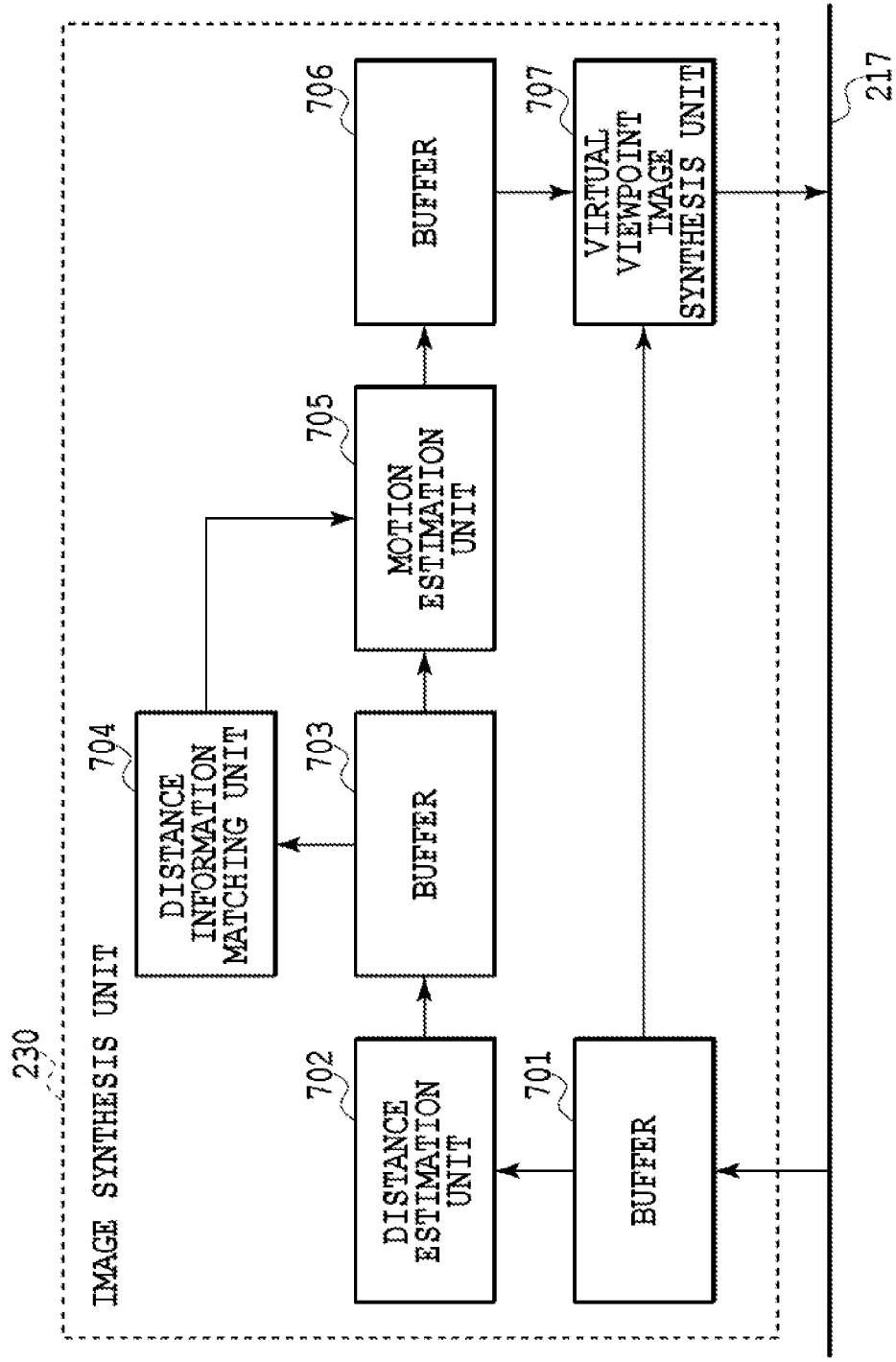
FIG. 7 is a block diagram showing an example of a configuration of an image synthesis unit according to the first embodiment of the present invention.

A configuration of the image synthesis unit 230 is described with use of FIG. 7. FIG. 7 is a block diagram showing an example of the configuration of the image synthesis unit 230.

A buffer 701 is a buffer for storing image data, and via the bus 217, receives and holds two pieces of image data obtained by the simultaneous image-capturing.

A distance estimation unit 702 performs corresponding point detection between two pieces of image data stored in the buffer 701, from the result of which distance information is calculated. The corresponding point detection is a process of detecting correspondence in feature point between the two pieces of image data. The distance information is information indicating a distance between a subject corresponding to the feature point and cameras capturing the subject. By calculating the distance information, a relationship in position and orientation between the cameras capturing the subject can be estimated. Coordinates of points in a space corresponding to a set of corresponding points detected by the distance estimation unit 702 are transmitted to a buffer 703 as a processing result showing the distance information. The distance estimation unit 702 also calculates a feature descriptor for identifying the set of detected corresponding points. The feature descriptor is also associated with the distance information and then transmitted to the buffer 703. Internal parameters of the cameras (angle of view, optical center, etc.) and external parameters (position, orientation) are required for the distance estimation, but those parameters are assumed to be known from design values and calibration results in the present embodiment. Methods for calculating distance estimation and feature descriptor are described in detail later.

The buffer 703 holds the distance information and feature descriptor calculated by the distance estimation unit 702. The buffer 703 holds pieces of information on continuous two times of simultaneous image-capturing. That is, the pieces of information on two sets of images, each set of which is captured by two cameras, are held.

A distance information matching unit 704 reads from the buffer 703 the pieces of distance information and feature descriptors regarding the continuous two times of simultaneous image-capturing, and matches the pieces of distance information to each other between the two times of simultaneous image-capturing based on the feature descriptors. Matching the pieces of distance information makes it possible to estimate motion of the cameras due to motion of the subject, camera shake or the like (i.e., motion of the entire image-capturing apparatus). A result of matching the pieces of distance information is sent to a motion estimation unit 705. A method for matching the pieces of distance information is described in detail later.

The motion estimation unit 705 estimates the camera motion during the continuous two times of simultaneous image-capturing from the matching result by the distance information matching unit 704 and the pieces of distance information stored in the buffer 703. This camera motion is motion occurring due to, for example, the camera shake. The estimated camera motion is sent to a buffer 706. A method for estimating motion is described in detail later.

The buffer 706 holds information representing the camera motion estimated by the motion estimation unit 705. Hereinafter, the information representing the camera motion is simply referred to as "camera motion". The camera motion is held during (the number of cameras/2) times of simultaneous image-capturing. That is, the camera motion is held until image-capturing by two cameras in the simultaneous image-capturing with the timing being shifted comes full circle and is again performed by the same cameras.

A virtual viewpoint image synthesis unit 707 synthesizes virtual viewpoint image data representing a virtual viewpoint image from the pieces of image data stored in the buffer 701 and the camera motion stored in the buffer 706. For example, positions of the cameras upon image-capturing can be calculated back from the camera motion. In this way, by taking the camera motion into consideration, information equivalent to the simultaneous image-capturing by camera arrays can be obtained. For example, in the present embodiment, the information equivalent to information obtained upon the simultaneous image-capturing by the 16 cameras can be obtained. The synthesized virtual viewpoint image data is outputted to the bus 217.

Note that in the present embodiment, the simultaneous image-capturing is performed by two cameras, but the present invention may be configured to perform the simultaneously image-capturing by three or more cameras. Further, the motion estimation is performed from the continuous two times of simultaneous image-capturing, but may be performed from three or more times of simultaneous image-capturing or discontinuous simultaneous image-capturing. Note that if the image-capturing is performed by a single camera rather than two cameras, disparity, camera motion, and subject motion exist with being mixed. Thus, by performing the simultaneous image-capturing with at least two or more cameras, the distance information can be properly calculated to obtain the camera motion.

(Flow of Image Synthesis Processing)

Figure 8:
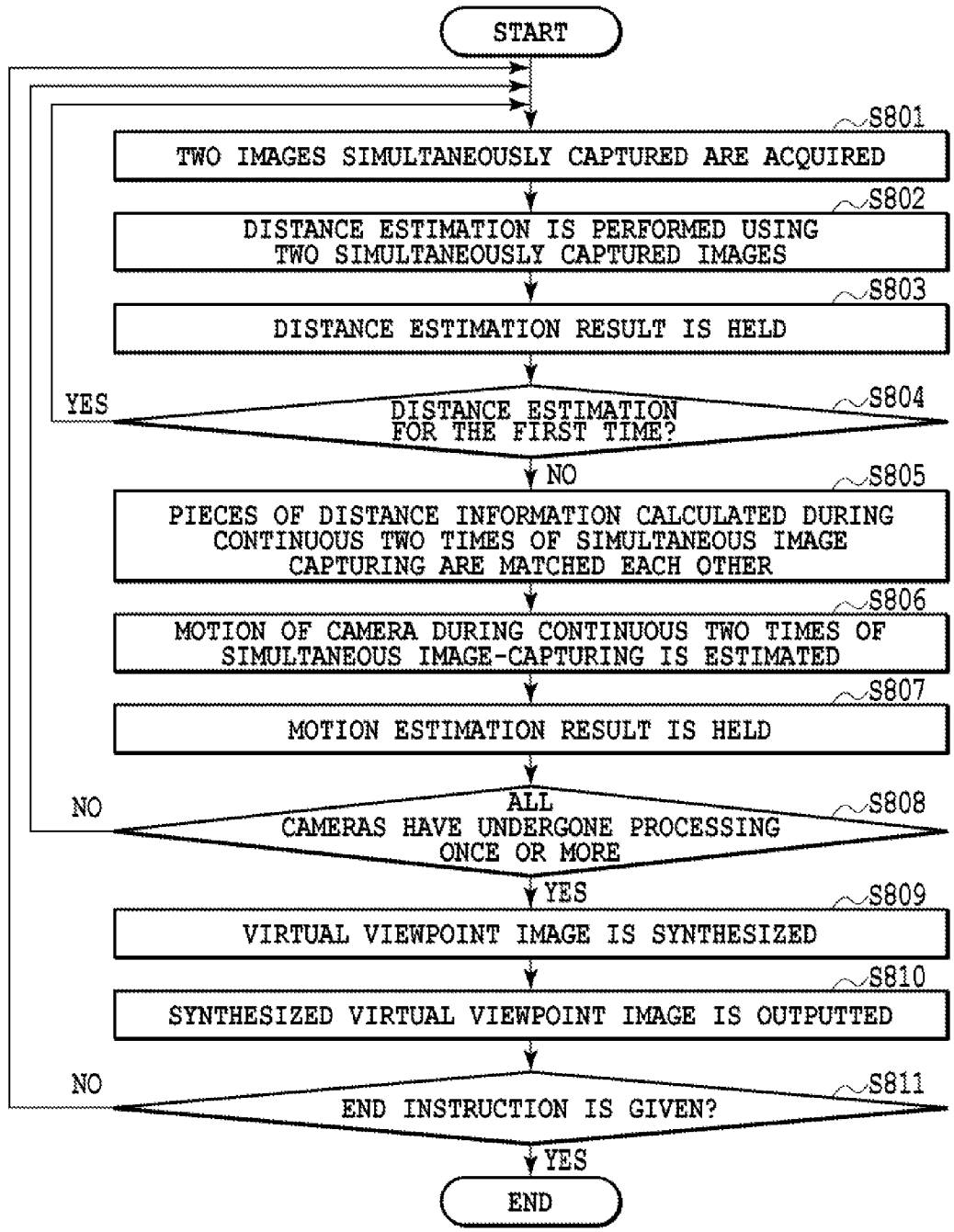
FIG. 8 is a flowchart showing an example of image synthesis processing according to the first embodiment of the present invention.

A flow of image synthesis processing is described with use of FIG. 8. FIG. 8 is a flowchart showing the flow of the image synthesis processing.

In step S801, two pieces of image data simultaneously captured are acquired. The pieces of image data are received and held by the buffer 701.

In step S802, distance estimation is performed using the two pieces of image data acquired in step S801. The distance estimation is performed based on the two pieces of image data stored in the buffer 701. Feature descriptors of points where the pieces of distance information are defined are also calculated together with the pieces of distance information. The method for calculating distance estimation and feature descriptors are described in detail later.

In step S803, the pieces of distance information and feature descriptors calculated in step S802 are held in the buffer 703. Here, the buffer 703 receives the pieces of distance information and feature descriptors calculated by the distance estimation unit 702, and holds them with relating them to each other.

In step S804, it is determined whether or not the processes from step S801 to step S803 have been performed for the first time after the start of the image synthesis processing. Step S805 requires results of two times of distance estimation, and therefore if the processes from step S801 to step S803 have been performed for the first time, the flow returns to step S801. If not, the flow proceeds to step S805.

In step S805, the pieces of distance information that are held in step S803 and calculated during the continuous two times of simultaneous image-capturing are matched each other. The matching process of the pieces of distance information each other are based on the feature descriptors that are held with being related to the pieces of distance information. The matching process is performed in such a manner that the distance information matching unit 704 reads out the pieces of distance information and feature descriptors from the buffer 703. A result of the matching is transmitted to the motion estimation unit 705. A matching method is described in detail later.

In step S806, camera motion is estimated during the continuous two times of simultaneous image-capturing. The motion estimation is performed by the motion estimation unit 705 based on the pieces of distance information stored in the buffer 703 and the result of matching the pieces of distance information obtained by the distance information matching unit.

In step S807, the camera motion estimated in step S806 is held. Here, the buffer 706 reads out and holds the calculation result by the motion estimation unit 705. The camera motion is held during (the number of cameras/2) times of simultaneous image-capturing.

In step S808, it is determined whether or not, after the start of the image synthesis processing, all the cameras (that is, all the image-capturing units 201 to 216) have undergone the processing once or more times. Since pieces of image data of all the cameras are required in step S809, if there remains an unprocessed camera, the flow returns to step S801 where the processing is repeated. If all the cameras have undergone the processing once or more times, the flow proceeds to step S809.

In step S809, virtual viewpoint image data is synthesized from the pieces of image data acquired in step S801 and the camera motion held in step S807. The image synthesis is performed by the virtual viewpoint image synthesis unit 707 based on the camera motion stored in the buffer 706 and the pieces of image data stored the buffer 701.

In step S810, the synthesized image data is outputted. Here, the image data synthesized by the virtual viewpoint image synthesis unit 707 is outputted to the bus 217.

In step S811, it is determined whether or not the processing ends. If an end instruction is given by the user, the processing ends, whereas if not, the flow returns to step S801 where the processing is repeated. Note that the above example shows the case where in step S808, it is determined whether or not all the cameras undergo the processing once or more times, but the present embodiment is not limited this process. For example, the determination in step S808 may be performed by determining whether or not a predetermined number of sets of image-capturing units among the 16 image-capturing units have undergone the processing.

(Methods for Calculating Distance Information and Feature Descriptor)

Figure 9:
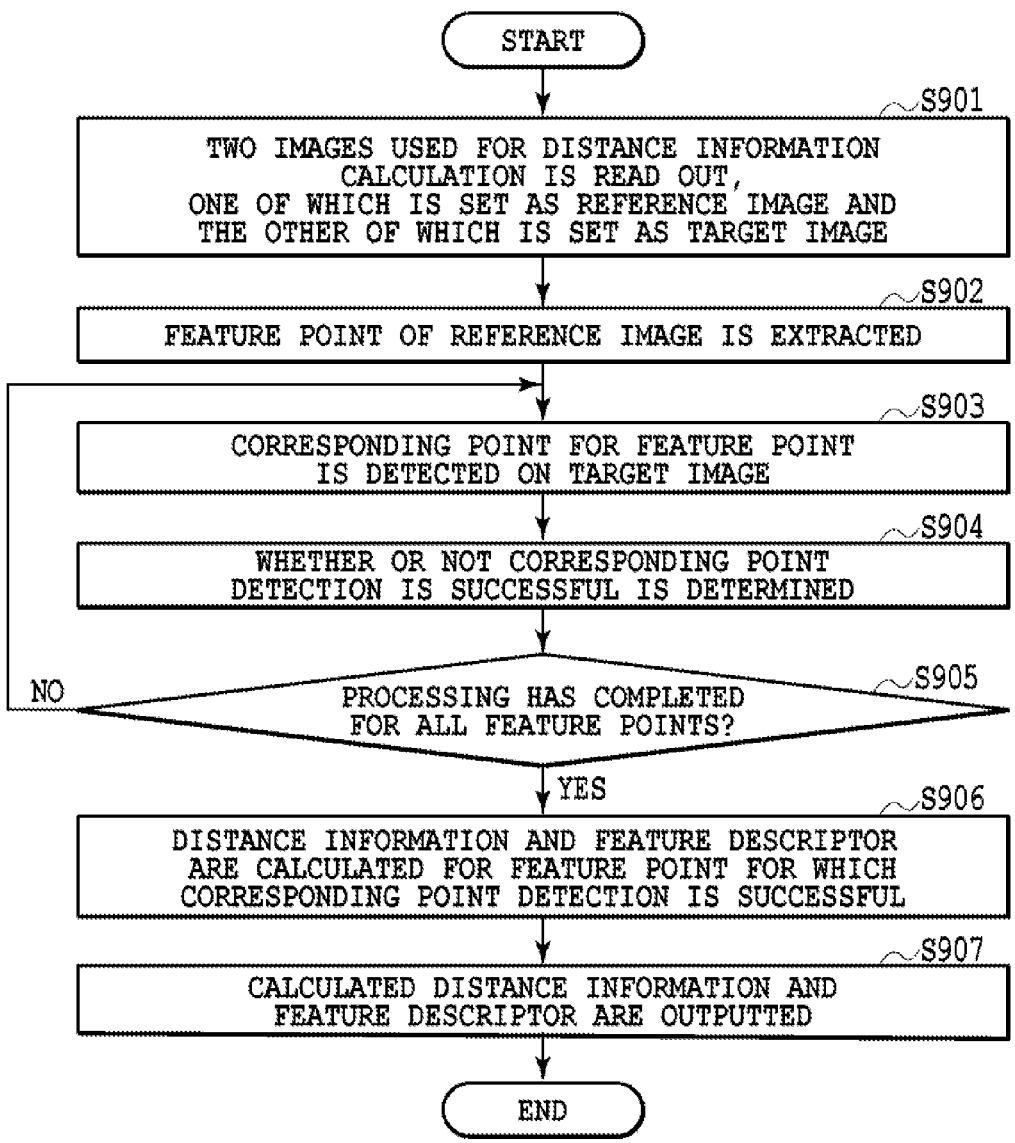
FIG. 9 is a flowchart showing an example of a distance information calculation method according to the embodiment of the present invention.

A method for detecting a corresponding point in the distance estimation unit 702 is described. FIG. 9 is a flowchart of distance information and feature descriptor calculation processing. Of two pieces of input image data are used for the processing, one is referred to as a reference image and the other is referred to as a target image. Here, the method is described in which a feature point of the reference image is extracted, and a point on a target image corresponding to the extracted feature point is found, from a result of which distance information and feature descriptor corresponding to the feature point is found.

In step S901, the two pieces of input image data are read out, and the reference image and target image are set.

In step S902, the feature point of the reference image is extracted. As a method for extracting the feature point, a publicly-known method can be used, such as "Harris Corner Detection" described in C. Harris and M. Stephens, "A combined corner and edge detector", Proceedings of the 4th Alvey Vision Conference, pp. 147-151. (1988).

In step S903, a point on the target image, which corresponds to the feature point obtained in step S902, is found. As a method for founding the corresponding point, a publicly-known method such as a block matching method can be used. The block matching method uses a sum of absolute differences or a sum of squared differences between pixel values of the reference image in the block and pixel values of the target image in the block as a matching evaluation value. Under assumption of a block having a certain feature point as a center on the reference image, with a relative position between the reference image and the target image being sequentially shifted, the evaluation values are found. The center position of the block on the processing target image when the evaluation value is minimized among the obtained evaluation values is the corresponding point of the feature point of interest. In addition, it is also possible that a relationship between the relative position and the evaluation value is fitted by absolute values of a linear function or a quadric, and the corresponding point is obtained from the relative position which is minimized on the obtained function, leading to high accuracy. Further, in the present embodiment, since it is assumed that the camera orientation is known, the searched range is limited onto an epipolar line, which can improve robustness and reduce calculation cost.

Note that the corresponding point obtained in step S903 may be incorrect sometimes. In step S904, it is determined whether or not the corresponding point obtained in step S903 is correct. Determination methods include, for example, a method in which it is checked whether the minimum evaluation value obtained in step S903 is not more than a threshold, and the corresponding point is determined to be correct if not more than the threshold, or to be incorrect if not less than the threshold.

Next, in step S905, it is determined whether or not the processing has been completed on all the feature points. If not completed, the flow returns to step S903 to perform the processing of unprocessed feature point, whereas if completed, the flow proceeds to step S906.

In step S906, the distance information and feature descriptor are calculated. First, the distance information calculation is described. It is assumed that that internal parameters of cameras capturing the reference image and target image are respectively denoted by A and A', image coordinates of the feature points are respectively denoted by (u, v) and (u', v'), and coordinate transformation matrix M of camera coordinates from the camera capturing the reference image to the camera capturing the target image is expressed as Equation (1):

$$M = \begin{pmatrix} R & T \\ 0 & 1 \end{pmatrix} \quad \text{Equation (1)}$$

Here, R is a 3×3 matrix representing rotation, and T is a 3×1 matrix representing translation. The relationship between (u, v) and (u', v') is expressed as Equation (2).

$$\lambda' \begin{pmatrix} u' \\ v' \\ 1 \end{pmatrix} = A'(R\ T) \begin{pmatrix} A^{-1} \begin{pmatrix} u \\ v \\ 1 \end{pmatrix} \\ \frac{1}{z} \end{pmatrix} \quad \text{Equation (2)}$$

Here, z is a distance to a point in a space corresponding to the feature point, and if, in step S903, the corresponding point detection is performed with 1/z being varied as a parameter, 1/z can be directly obtained. Assuming that three-dimensional coordinates of the point in the space corresponding to the feature point are (x, y, z), Equation (3) holds:

$$\begin{pmatrix} \frac{x}{z} \\ \frac{y}{z} \\ 1 \end{pmatrix} = A^{-1} \begin{pmatrix} u \\ v \\ 1 \end{pmatrix} \quad \text{Equation (3)}$$

In the present embodiment, (x/z, y/z, 1/z) is calculated as the distance information.

Next, the feature descriptor calculation is described. In the present embodiment, as for the feature descriptor, a distribution of pixel values of a block with (u, v) set as the center is used as the feature descriptor in a vector form.

In step S907, the calculated distance information and feature descriptor are outputted.

Note that the present embodiment does not limit the corresponding point detection method and feature descriptor calculation method, and another method may be used, such as a SIFT algorism disclosed in David G. Lowe, "Distinctive Image Features from Scale-Invariant Keypoints", International Journal of Computer Vision 60 (2), pp. 1-28, 2004. Additionally, the present embodiment is not limited to an aspect where the distance information is represented as (x/z, y/z, 1/z) using the coordinates (x, y, z) of the point in the space corresponding to the feature point, but any form of values may be held as the distance information as long as it has equivalent information.

(Method for Matching Pieces of Distance Information)

The method for, in the distance information matching unit 704, matching the pieces of distance information in the continuous two times of simultaneous image-capturing to each other is described. The distance information is associated with the feature descriptor via the feature point. In the present embodiment, a degree of coincidence between the feature descriptors is used to match the pieces of distance information to each other.

Here, of the images obtained by the continuous two times of simultaneous image-capturing, the first captured one is referred to as a "first simultaneous image-capturing", and the subsequently captured one is referred to as a "second simultaneous image-capturing".

Here, the first simultaneous image-capturing is taken as a reference. The feature point of the second simultaneous image-capturing is detected, which has the highest degree of coincidence in feature descriptor with respective to each of feature points of the first simultaneous image-capturing. If the pixel value distribution of the block adjacent to the feature point is used as the feature descriptor, the degree of coincidence J is only required to be set as Equation (4).

$$J = -\|p_1 - p_2\|_2 \quad \text{Equation (4)}$$

Here, $p_1$ and $p_2$ are vectors representing the feature descriptors of the feature points of the first simultaneous image-capturing and the second simultaneous image-capturing, respectively, which are used for calculating the degree of coincidence. The feature point of the second simultaneous image-capturing having the highest degree of coincidence in feature descriptor with respect to each of the feature points of the first simultaneous image-capturing is found and is set as a candidate for feature point correspondence. All the candidates for feature point correspondence are subjected to a threshold process using the degree of coincidence, and candidates for feature point correspondence having a certain degree of coincidence or more are set as a final relating combination.

Note that the present embodiment does not limit the method of matching the pieces of distance information, and another matching method may be used.

(Method for Motion Estimation)

A method for, in the motion estimation unit 705, estimating camera motion relative to a subject occurring during the continuous two times of simultaneous image-capturing is described. Here, of the continuous two times of simultaneous image-capturing, the first simultaneous image-capturing is referred to as first simultaneous image-capturing, and the subsequent simultaneous image-capturing is referred to as second simultaneous image-capturing.

It is assumed that distance information on an n-th feature point of the first simultaneous image-capturing is ($x_{1n}/z_{1n}$, $y_{1n}/z_{1n}$, $1/z_{1n}$), and distance information on a corresponding feature point of the second simultaneous image-capturing is ($x_{2n}/z_{2n}$, $y_{2n}/z_{2n}$, $1/z_{2n}$). Here, on the assumption that a subject performs rigid motion, a coordinate transformation matrix M from a camera corresponding to a reference image of the first simultaneous image-capturing to a camera corresponding to a reference image of the second simultaneous image-capturing is expressed as Equation (1). If a parameter of the motion to be found is denoted by ($R_{est}$, $T_{est}$), relationships between the pieces of distance information and the parameter of the motion are expressed as Equations (5) and (6):

$$\lambda \begin{pmatrix} \frac{x'_{1n}}{z'_{1n}} \\ \frac{y'_{1n}}{z'_{1n}} \\ 1 \\ \frac{1}{z'_{1n}} \end{pmatrix} = \begin{pmatrix} R & T \\ 0 & 1 \end{pmatrix} \begin{pmatrix} \frac{x_{1n}}{z_{1n}} \\ \frac{y_{1n}}{z_{1n}} \\ 1 \\ \frac{1}{z_{1n}} \end{pmatrix} \quad \text{Equation (5)}$$

$$(R_{est}, T_{est}) = \underset{(R,T)}{\arg\min} \left[ \sum_{n=1}^{N} \left\{ \left( \frac{x_{2n}}{z_{2n}} - \frac{x'_{1n}}{z'_{1n}} \right)^2 + \left( \frac{y_{2n}}{z_{2n}} - \frac{y'_{1n}}{z'_{1n}} \right)^2 + \left( \frac{1}{z_{2n}} - \frac{1}{z'_{1n}} \right)^2 \right\} \right] \quad \text{Equation (6)}$$

Here, N represents the number of cameras. λ is a coefficient representing indefiniteness. ($R_{est}$, $T_{est}$) can be found by applying nonlinear optimization such as the Levenberg-Marquardt algorithm to Equations (5) and (6). Note that since a matching error or the like generally occurs, in order to improve accuracy, it is preferable not only to find the motion parameter from Equations (5) and (6), but also to combine robust estimation such as the least median of squares or RANSAC algorithm.

Incidentally, the present embodiment does not limit the optimization method, but the motion may be estimated by use of another optimization method such as the steepest descent method or linear solution.

(Method for Synthesizing Virtual Viewpoint Image)

The method for synthesizing virtual viewpoint image data in the virtual viewpoint image synthesis unit 707 is described. Here, a transformation matrix that is known in advance based on design values and calibration and from coordinates of the camera array to coordinates of the n-th camera is expressed as $M_{0n}$. M is a transformation matrix with respect to three-dimensional homogeneous coordinates as represented by Equation (1). Additionally, a coordinate transformation matrix from the n-th camera to the m-th camera by which image-capturing is performed at another time is expressed as $M'_{nm}$.

Figure 10:
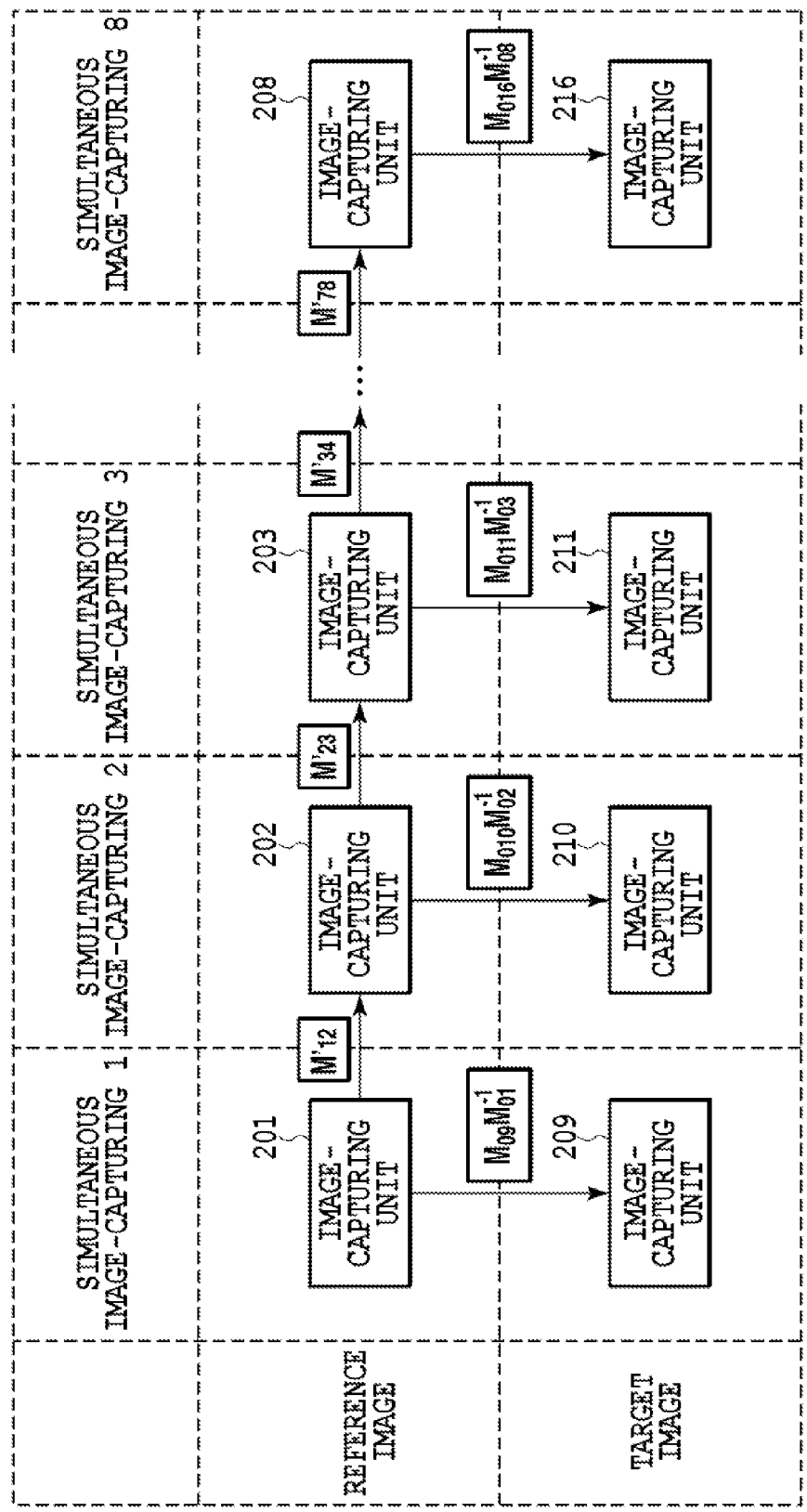
FIG. 10 is a schematic view illustrating a relationship between calculated motion of a camera and the camera according to the embodiment of the present invention.

FIG. 10 shows a relationship between the coordinate transformation matrix and the cameras of the respective image-capturing units, which is obtained from the known $M_{0n}$ and the $M'_{nm}$ found by the motion estimation in the case where the image-capturing is performed using the combinations and order as shown in FIG. 6. As is apparent from FIG. 10, by tracing and synthesizing the transformation matrix between the respective cameras, a coordinate transformation matrix from any camera to any other camera can be calculated. For example, if it is desired to calculate a coordinate transformation matrix from the coordinates of the camera array to the coordinates of the n-th camera at the time of the simultaneous image-capturing 8, it is only necessary to calculate $M'_{8n}M_{08}$. Here, $M'_{8n}$ is a coordinate transformation matrix from the image-capturing unit 208 as the eighth camera to the n-th camera, which is calculated by synthesizing the transformation matrix.

In this way, from a relationship in position and orientation between the known cameras, and a relationship in position and orientation between the cameras obtained by the motion estimation, a calibrated camera array may be reconstructed in time with any simultaneous image-capturing time. The virtual viewpoint image can be generated by the method disclosed in Isaksen, or the like, using the information on the position and orientation obtained in the above way and the images captured by the respective cameras.

As described above, according to the first embodiment, the images captured by the plurality of cameras are used to generate the virtual viewpoint image in consideration of the motions of the respective cameras. This makes it possible to, in the motion picture capturing system for synthesizing the virtual viewpoint image, produce an effect of, while maintaining estimation accuracy for the position and orientation of each of the cameras, improving frame rate performance.

Second Embodiment

In the first embodiment, an example is described, where camera motion is estimated during the simultaneous image-capturing on the assumption that motion of a subject with respect to the camera is simple. That is, in the first embodiment, the example is described, where the subject is stationary and the camera itself is moving. In the second embodiment, the case where subjects are a plurality of rigid bodies that differently move is described. That is, in the second embodiment, the case where at least one subject is moving is described.

(Configuration of Image Synthesis Unit)

Figure 11:
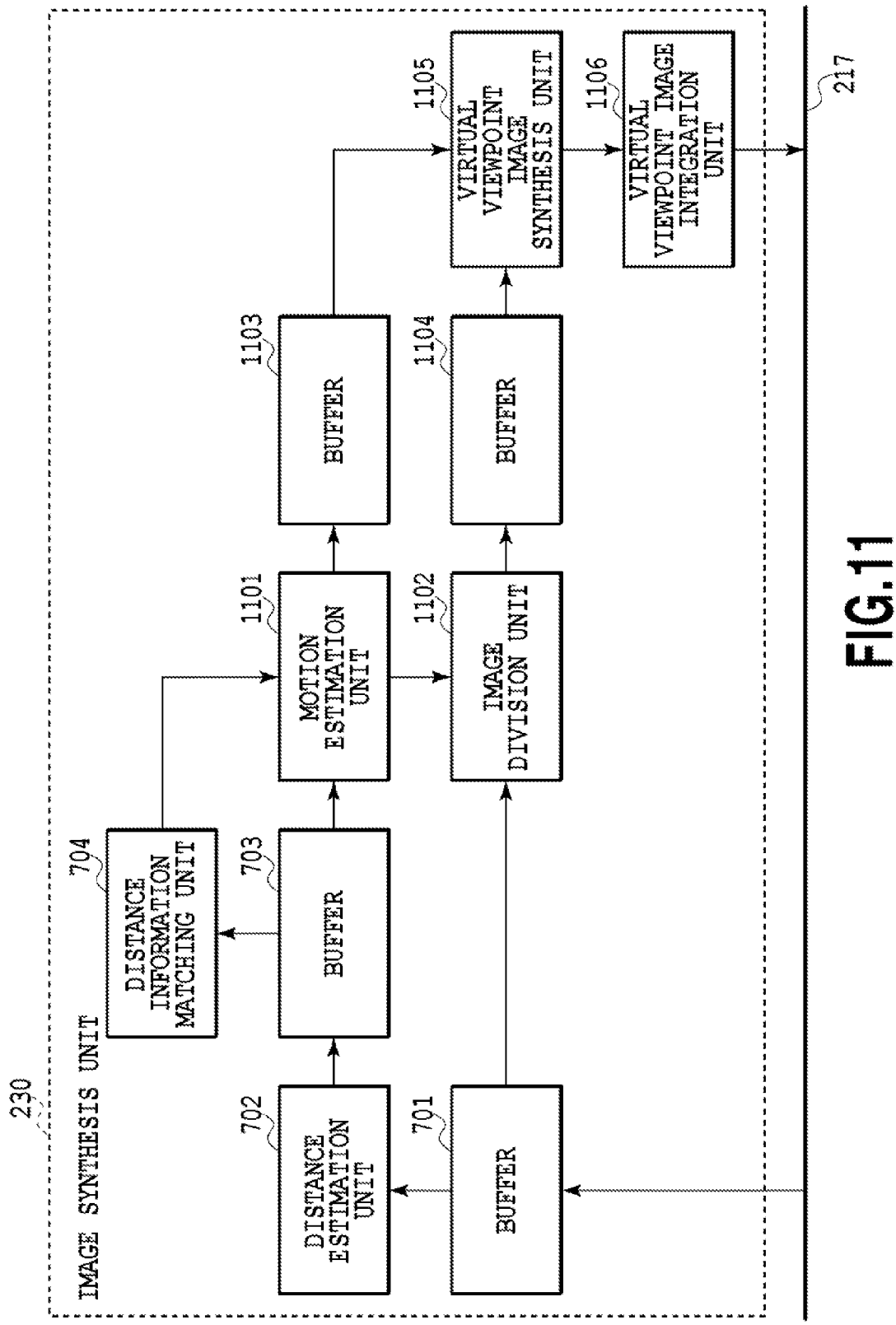
FIG. 11 is a block diagram showing an example of a configuration of an image synthesis unit according to a second embodiment of the present invention.

The second embodiment is different from the first embodiment in a configuration of the image synthesis unit 230. Hereinafter, description of the same portions as those in the first embodiment is omitted and different portions are mainly described. The configuration of the image synthesis unit 230 of the second embodiment is shown in FIG. 11. In the image synthesis unit of the second embodiment, operation of a motion estimation unit 1101, virtual viewpoint image synthesis unit 1105 and buffer 1103 is changed, and an image division unit 1102, buffer 1104 and virtual viewpoint image integration unit 1106 are added, as compare with the image synthesis unit of the first embodiment.

The motion estimation unit 1101 estimates camera motion with respect to a plurality of rigid body subjects and classifies distance information according to a rigid body to which the information belongs by robust estimation. For example, the robust estimation extracts the most dominant motion (i.e., background motion due to a camera shake). The motion belonging to the background can be also extracted as the motion of the rigid body subject. In the case where the subject itself is moving, each feature points group identically moving except for the feature points belonging to the background can be treated as the rigid body subject. Since the distance information is classified according to each rigid body, a region of the rigid body is specified such that the motion of the rigid body can be traced as described later. The motion estimation unit 1101 extracts and passes to the image division unit 1102 the classification of the distance information and coordinates on an image for which the distance information is defined. The plurality of estimated motions are passed to the buffer 1103. A method for estimating camera motion with respect to the plurality of rigid body subjects using the robust estimation is described in detail later. The motion estimation unit also relates the plurality of rigid body subjects found from the last but one simultaneous image-capturing and the last simultaneous image-capturing to the plurality of rigid body subjects found from the last simultaneous image-capturing and the present simultaneous image-capturing. As the relating method, there is a method in which distance information defined for the last simultaneous image-capturing is related to the rigid body subject that shares, as distance information belonging thereto, much more pieces of distance information, or other method.

The image division unit 1102 divides an image stored in the buffer 701 into regions belonging to each of the rigid body subjects from coordinates on the image corresponding to the classified distance information, and passes the divided images to the buffer 1104. A method for the image division is described in detail later.

The buffer 1103 holds the motions estimated for the plurality of rigid body subjects by the motion estimation unit 1101 until image-capturing comes full circle through all the cameras.

The buffer 1104 holds pieces of divided image data which are calculated by the image division unit 1102 and indicate the plurality of images divided so as to belong to any of the plurality of rigid body subjects until image-capturing comes full circle through all the cameras.

The virtual viewpoint image synthesis unit 1105 reads out the motion and pieces of divided image data corresponding to each of the rigid body subjects from the buffers 1103 and 1104, respectively, and synthesizes a virtual viewpoint image corresponding to the rigid body subject. The synthesized image is passed to the virtual viewpoint image integration unit 1106.

The virtual viewpoint image integration unit 1106 receives a plurality of pieces of virtual viewpoint image data corresponding to the respective rigid body subjects from the virtual viewpoint image synthesis unit 1105, and sums and integrates the pieces of data into one image. The integration is performed by averaging the pieces of image data on the plurality of images, and the like. The integrated image data is outputted to the bus 217.

(Flow of Image Synthesis Processing)

Figure 12B:
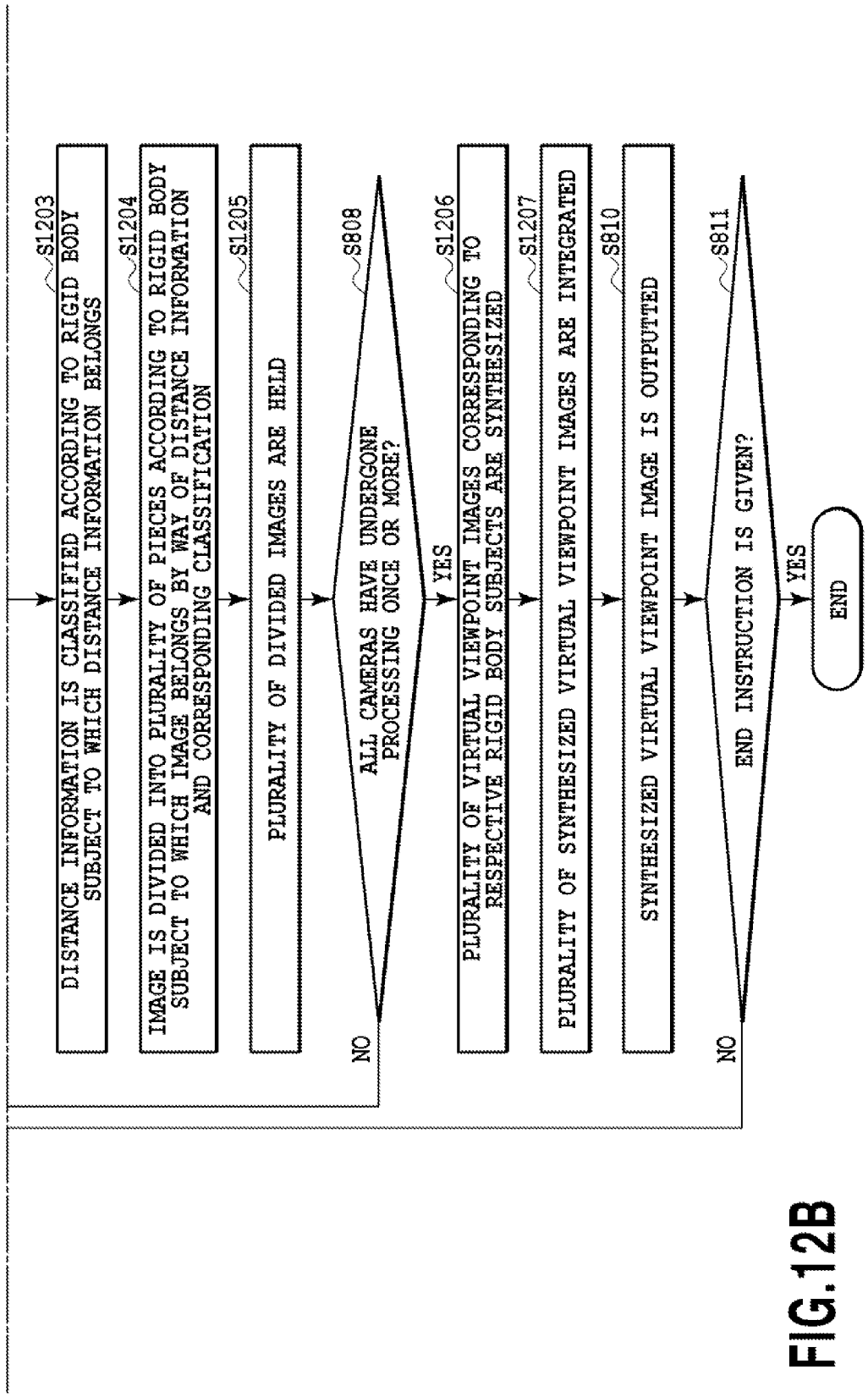

The second embodiment is different from the first embodiment in image synthesis processing in the image synthesis unit 230. A flowchart of the image synthesis processing is shown in FIGS. 12A and 12B. In the second embodiment, changes are made from step S806 to step S1201, from step S807 to step S1202, and from step S809 to step S1206, as compared with the first embodiment. Further, in the second embodiment, step S1203, steps S1204, S1205 and S1207 are added, which is different from the first embodiment.

In step S1201, camera motion estimation is performed with respect to the plurality of rigid body subjects. Motion estimation processing is performed by the motion estimation unit 1101. A method for the motion estimation with respect to the plurality of rigid body subjects is described in detail later.

In step S1202, the camera motion estimated in step S1201 with respect to the plurality of rigid body subjects is held. The estimated camera motion is held in such a manner that the buffer 1103 receives a result of the estimation from the motion estimation unit 1101 to store it.

In step S1203, distance information is classified according to a rigid body subject to which the distance information belongs. The classification of the distance information is performed by the motion estimation unit 1101 together with the motion estimation. A method for classifying the distance information is described in detail later together with the method for the motion estimation with respect to the plurality of rigid body subjects.

In step S1204, an image is divided into a plurality of pieces according to the classified distance information. The image division is performed by the image division unit 1102.

In step S1205, pieces of divided image data on images resulting from the division according to the distance information classified in step S1203 are held. The divided images are held in such a way that the buffer 1104 receives the pieces of divided image data from the image division unit 1102 to store them.

In step S1206, a virtual viewpoint image of each of the rigid body subjects is synthesized from the pieces of divide image data and the camera motion estimated with respect to the plurality of rigid body subjects. The synthesis of the virtual viewpoint image is performed by the virtual viewpoint image synthesis unit 1105.

In step S1207, the plurality of images synthesized in step S1206 are integrated into one image. The integration is performed by averaging the pieces of image data on the plurality of images, or the like. The integration of the images is performed by the virtual viewpoint image integration unit 1106.
(Method of Motion Estimation with Taking Plurality of Rigid Body Subjects into Consideration)

Figure 13:
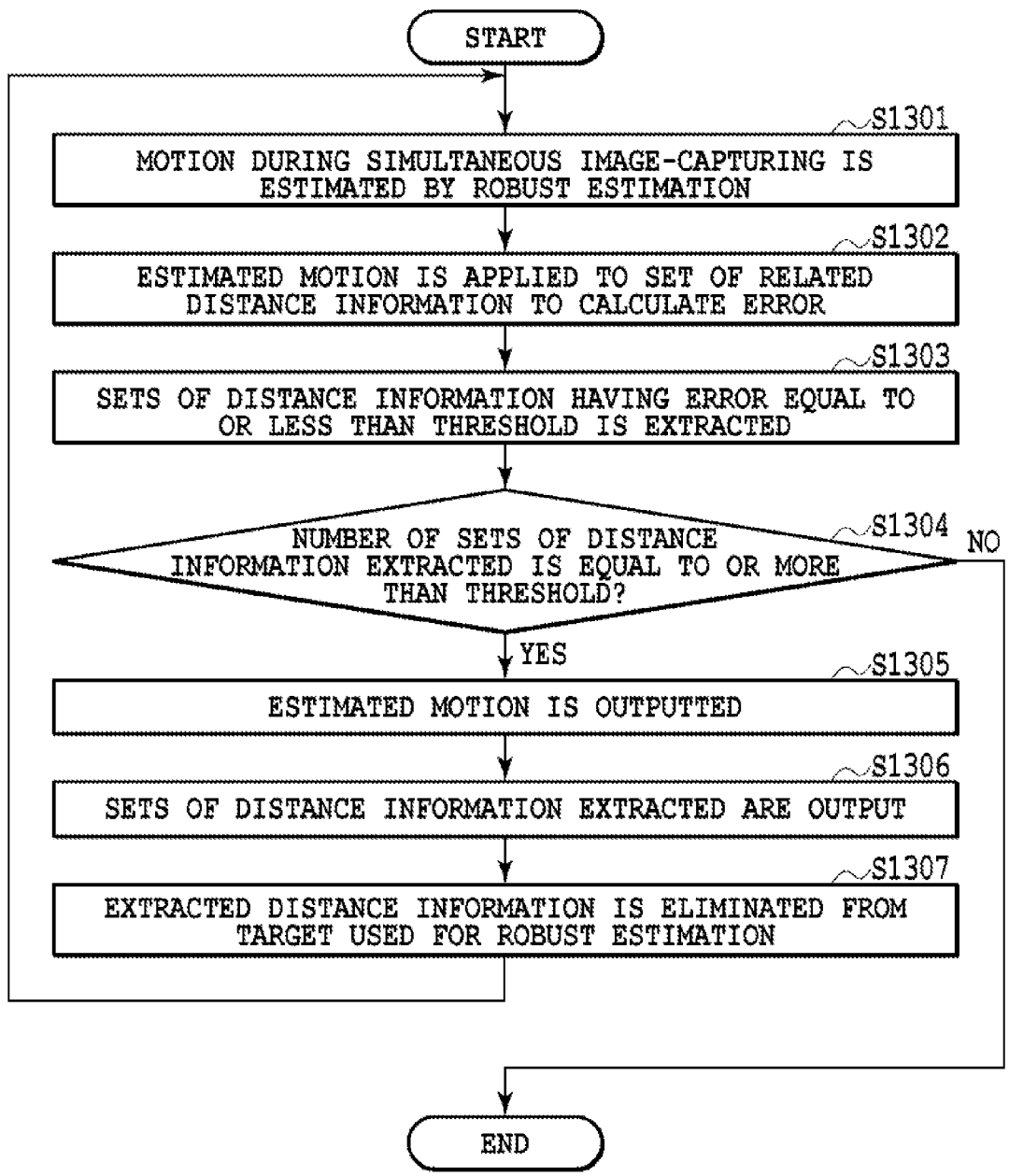
FIG. 13 is a flowchart showing an example of motion estimation processing for a scene including a plurality of rigid body subjects according to the embodiment of the present invention.

The method of the motion estimation with taking the plurality of rigid body subjects into consideration and the method of the classification of the distance information are described, which are performed by the motion estimation unit 1101. FIG. 13 is a flowchart illustrating the processing methods.

In step S1301, the motion estimation is performed by the robust estimation, and the method of the motion estimation is the same as that in the first embodiment. In the case where the plurality of rigid body subjects exist, the motion with respect to the rigid body subjects for which many pieces of distance information are calculated is estimated by the robust estimation.

In step S1302, the motion estimated in step S1301 is applied to the plurality of sets of distance information matched by the distance information matching unit 704 in FIG. 11 and in step S805 in FIG. 12A to calculate an error. The application of the motion is performed according to Equation (5) and the error E is calculated according to Equation (7).

$$E = \left(\frac{x_{2n}}{z_{2n}} - \frac{x'_{1n}}{z'_{1n}}\right)^2 + \left(\frac{y_{2n}}{z_{2n}} - \frac{y'_{1n}}{z'_{1n}}\right)^2 + \left(\frac{1}{z_{2n}} - \frac{1}{z'_{1n}}\right)^2 \quad \text{Equation (7)}$$

In step S1303, sets of distance information are extracted, which have the error E equal to or less than a threshold.

In step S1304, it is determined whether or not the number of sets of the distance information extracted in step S1303 is equal to or more than a threshold. If less than the threshold, the processing ends on the assumption that no more rigid body can be extracted. If equal to or more than the threshold, the flow proceeds to step S1305.

In step S1305, the motion estimated in step S1301 is outputted.

In step S1306, the sets of distance information extracted in step S1303 are outputted.

In step S1307, the sets of distance information extracted in step S1303 are eliminated from candidates for the robust estimation in step S1301. After the elimination, the flow returns to step S1301 to repeat the processing.

Through the above processing, the motion estimation with taking the plurality of rigid body subjects into consideration and the classification of the distance information can be performed.
(Method for Dividing Image by Way of Classified Distance Information)

The method for dividing an image by the image division unit 1102 by way of classified distance information is described. Coordinates of a point defined on the image in distance information belonging to each rigid body subject can be acquired by the distance information classification processing performed by the motion estimation unit 1101. Methods for calculating a region belonging to a certain rigid body subject include, for example, a method using Delaunay triangulation, and the like. In this method, the region on the image is divided by triangulation based on the point corresponding to the distance information, and a triangular region surrounded by points belonging to a target rigid body subject is taken as a region belonging to the certain rigid body subject. When the divided images belonging to the certain region are created, as for the region belonging to the certain rigid body subject on the image, a region of an image before the division is used as it is, and as for the other regions, the divided images are generated by setting a pixel value to zero.

As described above, according to the second embodiment, in the motion picture capturing system for synthesizing a virtual viewpoint video, even for a scene in which the plurality of rigid body subjects move differently, an effect of improving frame rate performance while suppressing image deterioration is produced.

Third Embodiment

In the second embodiment, the motion estimation and the synthesis of the virtual viewpoint image are performed on the assumption that the scene is constituted by only the rigid body subjects. In the third embodiment, the case where the scene includes a subject other than the rigid body is described. That is, the case where the scene includes such a subject that varies itself with time is described. If the images of the subject other than the rigid body, which are captured by the simultaneous image-capturing by use of another time axis, are synthesized to generate the virtual viewpoint image, the subject itself varies and thus multi-disparity information about the subject portion is difficult to create. Therefore, the present embodiment describes an example in which a blurred image is created for the subject other than the rigid body.

Figure 14:
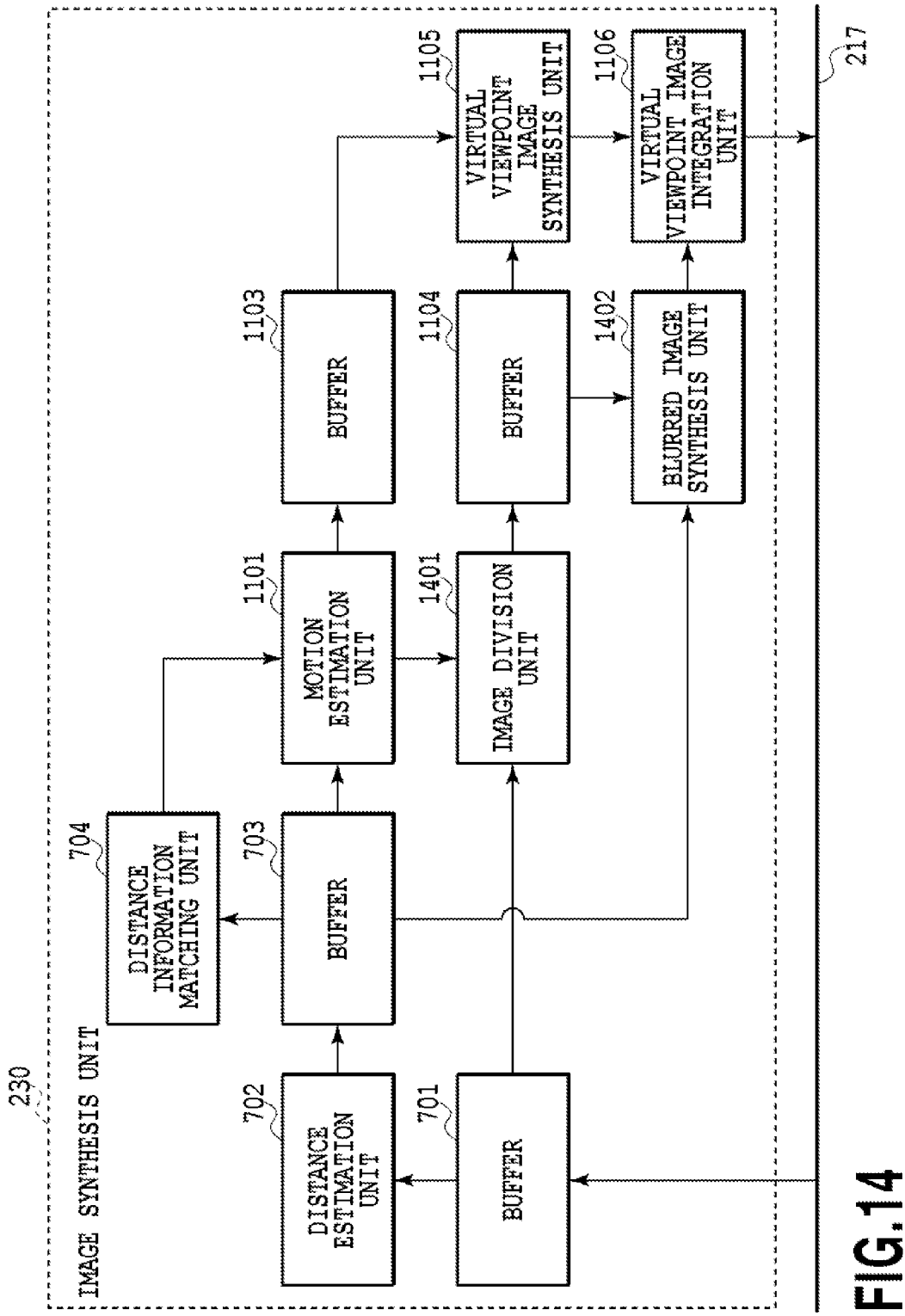
FIG. 14 is a block diagram showing an example of a configuration of an image synthesis unit according to a third embodiment of the present invention.

The third embodiment is different from the second embodiment in the image synthesis unit 230. Hereinafter, description of the same portions as those in the second embodiment is omitted, and different portions are mainly described. A configuration of the image synthesis unit 230 according to the third embodiment is shown in FIG. 14. In the image synthesis unit of the third embodiment, operation of an image division unit 1401 is changed and a blurred image synthesis unit 1402 is added as compare with the image synthesis unit of the second embodiment.

The image division unit of the second embodiment divides an image according to a rigid body subject to which a region of the image belongs. The image division unit of the third embodiment deals with also a region not belonging to the rigid body subject as a non-rigid body subject region to extract and output an image. For example, a set of distance information other than those whose error is determined to be equal to or less than the threshold in step S1303 in FIG. 13 can be extracted as the non-rigid body subject region. The output image is passed to and stored in the buffer 1104.

The blurred image synthesis unit 1402 generates an image blurred owing to a distance as the virtual viewpoint image for the non-rigid body subject region. That is, the blurred image for the non-rigid body subject is generated as the virtual viewpoint image by way of distance information estimated by the distance estimation unit 702. A method for generating the blurred image is known, and thus the description thereof is omitted here. The distance information is stored in the buffer 703, and read out and used. The buffer 703 is defined only for discrete positions on the image, and thus linear interpolation or the like is applied to define distances all over the image in order to blur the image. As the image of the non-rigid body subject region, an image corresponding to time serving as a reference for generating the virtual viewpoint image is used. A size of the blur is set so as to be smaller as the distance becomes closer to a distance used as a focus distance in the virtual viewpoint image synthesis unit 1105, and to be larger as the distance becomes farther.

Figure 15A:
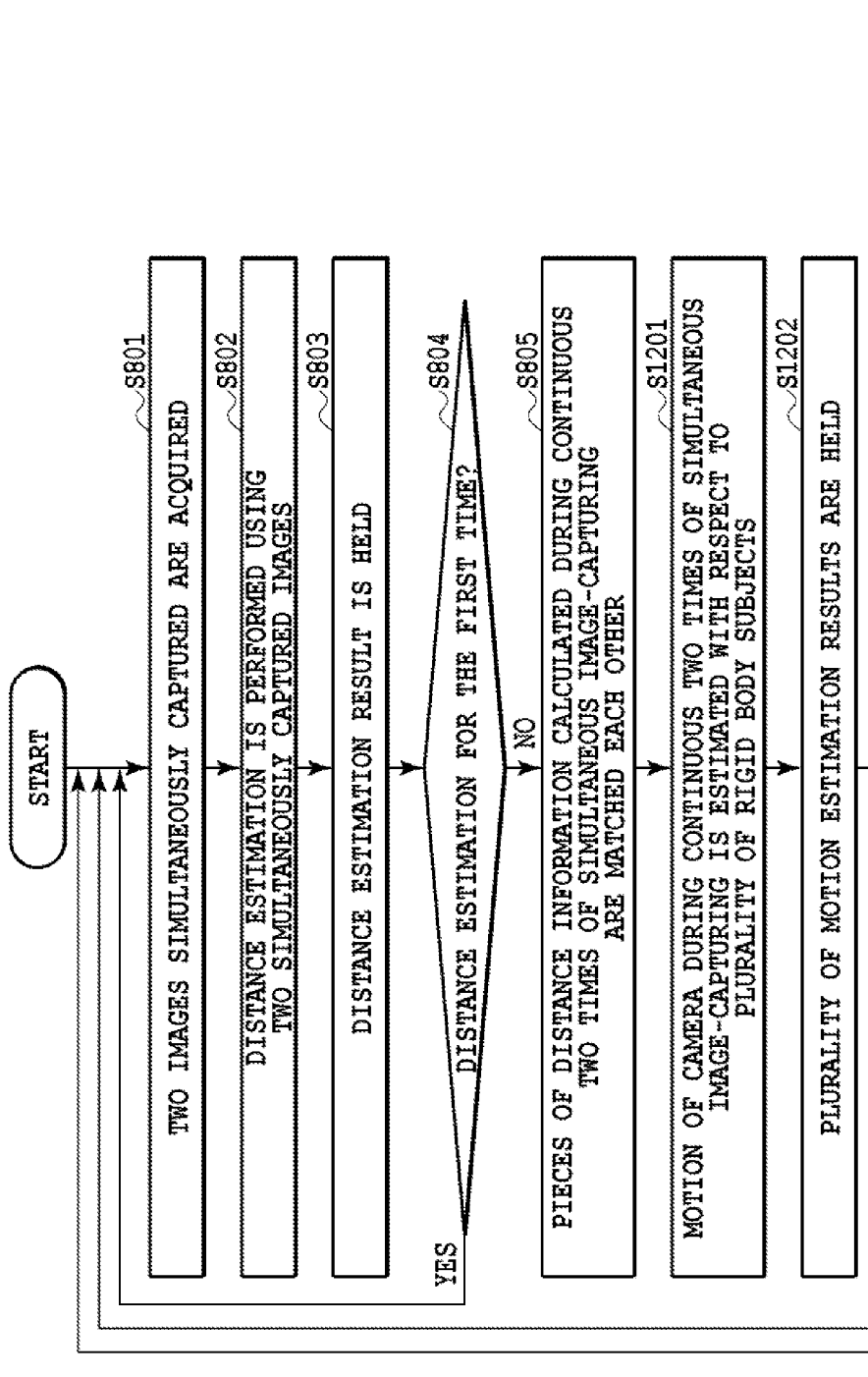
FIGS. 15A and B are flow charts showing an example of image synthesis processing according to the third embodiment of the present invention.
Figure 15B:
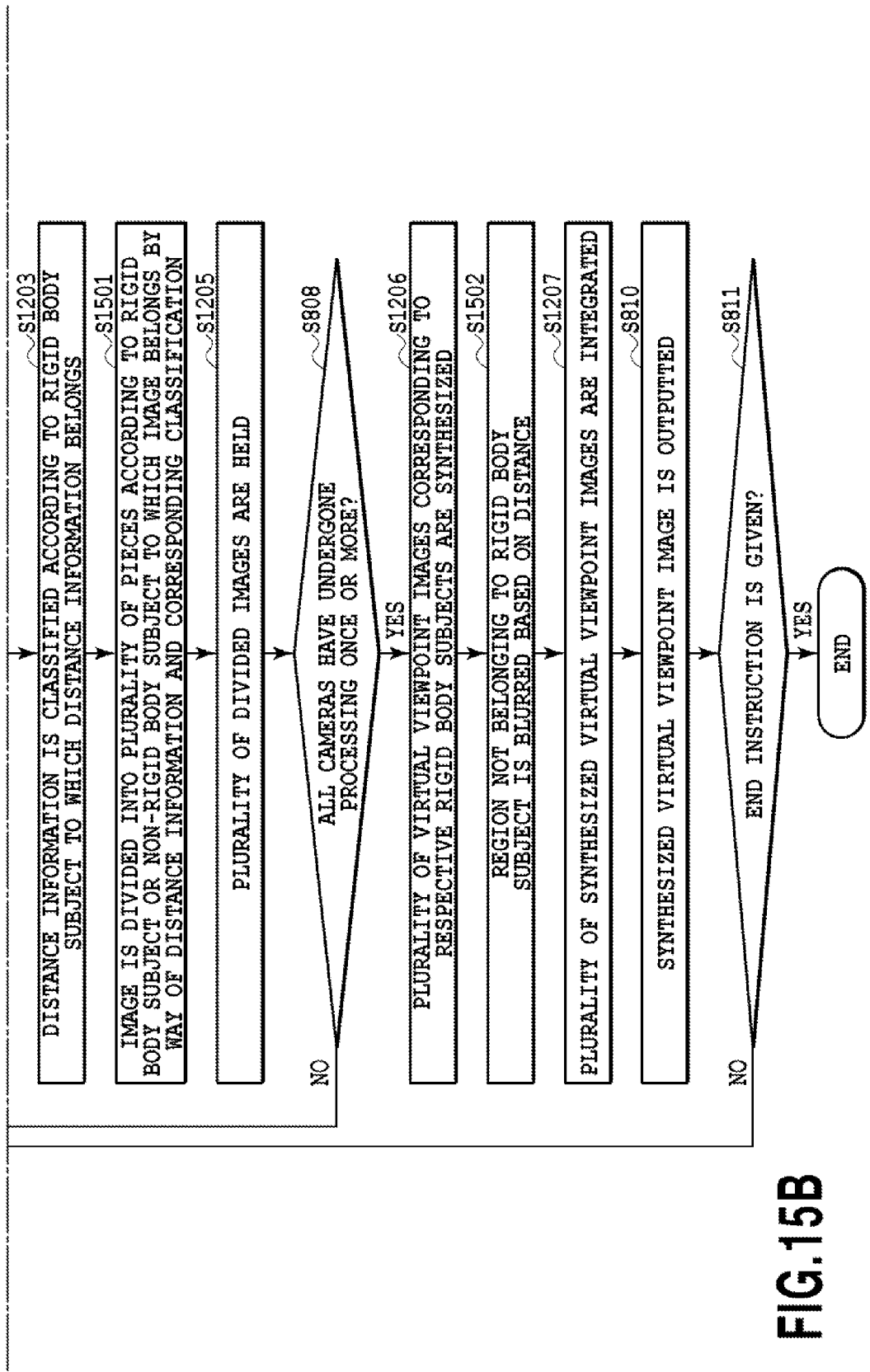
FIG. 15 is a diagram showing the relationship of FIGS. 15A and 15B.

A flow of the image synthesis processing of the third embodiment is shown in a flowchart of FIGS. 15A and 15B. Compared with the second embodiment, the process performed in step S1501 is changed and step S1502 is added.

In step S1501, an image division process is performed which is similar to that in the second embodiment, but different in that the divided images are also generated for the region belonging to the non-rigid body subject. In step S1501, the image division unit 1401 performs the process.

In step S1502, the divided images belonging to the non-rigid body subject region are blurred based on the distance. A blurring process is performed by the blurred image synthesis unit 1402.

As described above, according to the third embodiment, in the motion picture image-capturing system for synthesizing a virtual viewpoint video, even for a scene in which the non-rigid body moving subject exists, an effect of improving frame rate performance is produced while suppressing image deterioration.

Other Embodiments

Note that the above embodiments describe the examples in which the image-capturing unit corresponds to the camera and the plurality of cameras are used as the plurality of image-capturing units. Specifically, the examples are described in which the mechanism shown in FIG. 3 is provided for each of the plurality of cameras. In the examples, then, the images obtained by these cameras are used to generate the virtual viewpoint image. However, for example, in some cases, the image-capturing unit may correspond to the single image-capturing element 308 shown in FIG. 3. That is, a configuration may be employed in which one image-capturing element is divided into a plurality of areas and the divided areas are provided with corresponding lenses. Further, a configuration may be employed in which a minute lens or a predetermined spatial frequency pattern is arranged is arranged on a surface of one image-capturing element. Alternatively, a configuration may be employed in which the diaphragm 303 on the lens side is adjusted to partially change the aperture of the lens.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-089445, filed Apr. 13, 2011, which is hereby incorporated by reference herein in its entirety.

What is claimed is:

1. An image-capturing apparatus comprising:
    a plurality of cameras which are provided in a single body;
    an image-capturing timing control unit configured to control image-capturing timing of a plurality of groups of the plurality of cameras including a first group of cameras comprising two or more of the plurality of cameras that perform simultaneous image-capturing and a second group of cameras comprising two or more of the plurality of cameras that perform simultaneous image-capturing and are not included in the first group of cameras, wherein the first group of cameras performs image-capturing at a different timing from the second group of cameras;
    a distance estimation unit configured to estimate distance information of a subject at timings of image-capturing corresponding to the first and second groups of cameras from pieces of image data acquired by the simultaneous image-capturing; and
    a virtual viewpoint image synthesis unit configured to synthesize virtual viewpoint image data from pieces of image data captured by the plurality of cameras and the distance information estimated by the distance estimation unit.

2. The image-capturing apparatus according to claim 1, further comprising:
    a position estimation unit configured to estimate positions of the plurality of cameras at each timing of image-capturing corresponding to the first and second groups of cameras based on the distance information estimated by the distance estimation unit,
    wherein the virtual viewpoint image synthesis unit synthesizes the virtual viewpoint image data based on the positions estimated by the position estimation unit.

3. An imaging-capturing apparatus according to claim 1, wherein the virtual viewpoint image synthesis unit synthesizes first virtual viewpoint image data corresponding to the timing of image-capturing corresponding to the first group of cameras based on pieces of image data captured by the first group of cameras and the distance information of a subject at the timing of image-capturing corresponding to the first group of cameras, and
    the virtual viewpoint image synthesis unit also synthesizes second virtual viewpoint image data corresponding to the timing of image-capturing corresponding to the second group of cameras based on pieces of image data captured by the second group of cameras and the distance information of a subject at the timing of image-capturing corresponding to the second group of cameras.

4. An image-capturing apparatus according to claim 1, wherein the virtual viewpoint image synthesis unit synthesizes the virtual viewpoint image data from pieces of latest image data captured by each of the plurality of cameras.

5. An image-capturing apparatus according to claim 1, wherein an image-capturing interval between the first timing and the second timing is shorter than frame intervals of each of the cameras comprised in the first camera group and the second camera group.

6. An image-capturing apparatus according to claim 1, wherein the virtual viewpoint image data synthesized by the virtual viewpoint image synthesis unit represent an image captured by a camera having a certain size of aperture.

7. The image-capturing apparatus according to claim 2, further comprising:
- a classification unit configured to classify a plurality of subjects representing different motion according to the distance information estimated by the distance estimation unit,
- wherein the virtual viewpoint image synthesis unit synthesizes a plurality of pieces of virtual viewpoint image data corresponding to the plurality of subjects classified by the classification unit.

8. The image-capturing apparatus according to claim 7, further comprising:
- a virtual viewpoint image integration unit configured to generate integrated image data by integrating the plurality of pieces of virtual viewpoint image data.

9. A method of controlling an image-capturing apparatus having a plurality of cameras which are provided in a single body, the method comprising:
- an image-capturing timing control step of controlling image-capturing timing of a plurality of groups of the plurality of cameras including a first group of cameras comprising two or more of the plurality of cameras that perform simultaneous image-capturing and a second group of cameras comprising two or more of the plurality of cameras that perform simultaneous image-capturing and are not included in the first group of cameras, wherein the first group of cameras performs image-capturing at a different timing from the second group of cameras;
- a distance estimation step of estimating distance information of a subject at timings of image-capturing corresponding to the first and second groups of cameras from pieces of image data acquired by the simultaneous image-capturing; and
- a virtual viewpoint image synthesis step of synthesizing virtual viewpoint image data from pieces of image data captured by the plurality of cameras and the distance information estimated in the distance estimation step.

10. A program on a non-transitory computer-readable storage medium, the program causing a computer to execute the control method according to claim 9.

11. An information processing apparatus for controlling a plurality of cameras which are provided in a single body, comprising:
- an image-capturing timing control unit configured to control image-capturing timing of a plurality of groups of the plurality of cameras including a first group of cameras comprising two or more of the plurality of cameras that perform simultaneous image-capturing and a second group of cameras comprising two or more of the plurality of cameras that perform simultaneous image-capturing and are not included in the first group of cameras, wherein the first group of cameras performs image-capturing at a different timing from the second group of cameras;
- a distance estimation unit configured to estimate distance information of a subject at timings of image-capturing corresponding to the first and second groups of cameras from pieces of image data acquired by the simultaneous image-capturing; and
- a virtual viewpoint image synthesis unit configured to synthesize virtual viewpoint image data from pieces of image data captured by the plurality of cameras and the distance information estimated by the distance estimation unit.

12. An image-capturing apparatus comprising:
- a first camera group comprising a plurality of cameras which performs simultaneous image-capturing from viewpoints different from each other at a first timing, plurality of cameras being provided in a single body;
- a second camera group comprising a plurality of cameras which are not included in the first camera group and performs simultaneous image-capturing from viewpoints different from each other at a second timing different from the first timing, the plurality of cameras being provided in the single body;
- a distance estimation unit configured to estimate, by using a first image group comprising a plurality of images simultaneously captured by the first camera group at the first timing, first distance information which indicates a distance to a subject at the first timing, and, by using a second image group comprising a plurality of images simultaneously captured by the second camera group at the second timing, second distance information which indicates a distance to the subject at the second timing; and
- a virtual viewpoint image synthesis unit configured to synthesize, by using the first distance information and the first image group, a first virtual viewpoint image data corresponding to the first timing, and, by using the second distance information and the second image group, a second virtual viewpoint image data corresponding to the second timing,
- wherein the first camera group does not simultaneously perform image capturing with the second camera group and the image-capturing interval between the first camera group and the second camera group is shorter than individual frame intervals of each of the cameras included in the first camera group and the second camera group.

* * * * *